United States Patent [19]

Isozaki

[11] Patent Number: 5,450,451
[45] Date of Patent: Sep. 12, 1995

[54] APPARATUS FOR GENERATING A SYNCHRONIZING SIGNAL

[75] Inventor: Masaaki Isozaki, Kanagawa, Japan

[73] Assignee: Sony Corporation, Tokyo, Japan

[21] Appl. No.: 217,637

[22] Filed: Mar. 25, 1994

[30] Foreign Application Priority Data

Mar. 26, 1993 [JP] Japan .................................. 5-068457

[51] Int. Cl.[6] ............................................. H04L 7/00
[52] U.S. Cl. .................................... 375/273; 375/365
[58] Field of Search ............... 375/114, 116, 365, 368; 370/105.1, 105.4, 105.6

[56] References Cited

U.S. PATENT DOCUMENTS 5,140,618  8/1992  Kinoshita et al. .................... 375/116

Primary Examiner—Stephen Chin
Assistant Examiner—Huong Luu
Attorney, Agent, or Firm—William S. Frommer; Alvin Sinderbrand

[57] ABSTRACT

A synchronizing signal generating apparatus generates a synchronizing signal from digital data in which a synchronizing signal formed of a fixed data pattern having a predetermined bit number is inserted at a predetermined time interval L. The synchronizing signal generating apparatus is comprised of a delay circuit for obtaining a plurality of digital data having a delay time of n times (n is a positive integer) as long as the predetermined time interval L by delaying the digital data at the unit of the time interval L, a bit shift detector for detecting a phase coincident with the fixed data pattern by delaying the digital data at the bit unit, a plurality of bit shifters for bit-shifting a plurality of digital data outputted from the delay circuit in response to detected result of the bit shift detector, a plurality of synchronizing detectors for detecting whether or not a plurality of digital data bit-shifted by the plurality of the bit shifters and the fixed data pattern are coincident with each other, and a synchronizing signal generating circuit for generating a synchronizing signal in response to an output signal of the synchronizing detectors which detected coincidence between the digital data and the fixed data pattern.

16 Claims, 20 Drawing Sheets

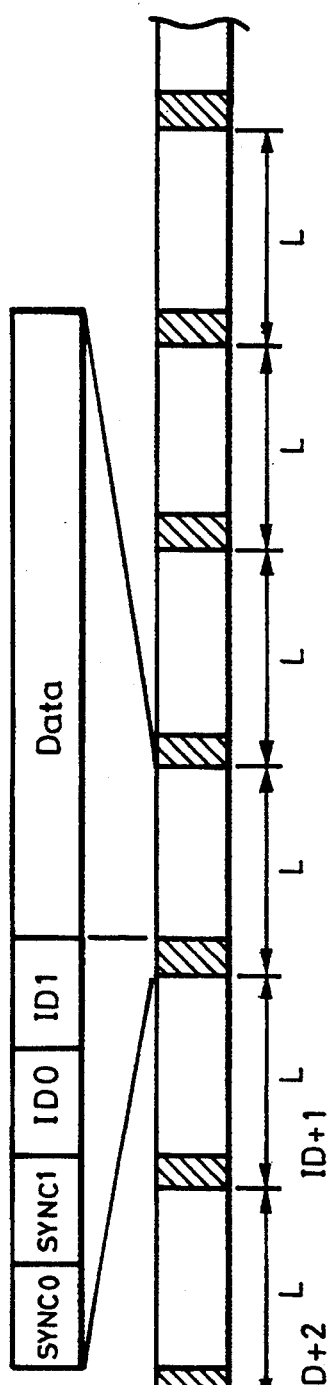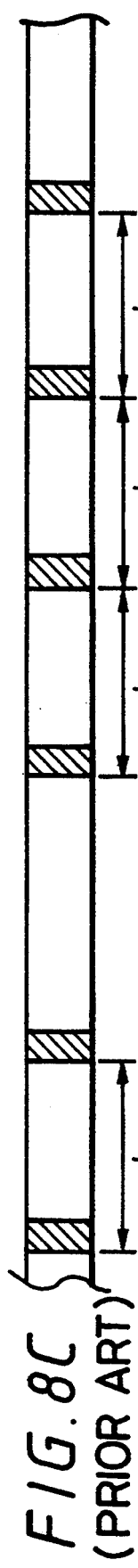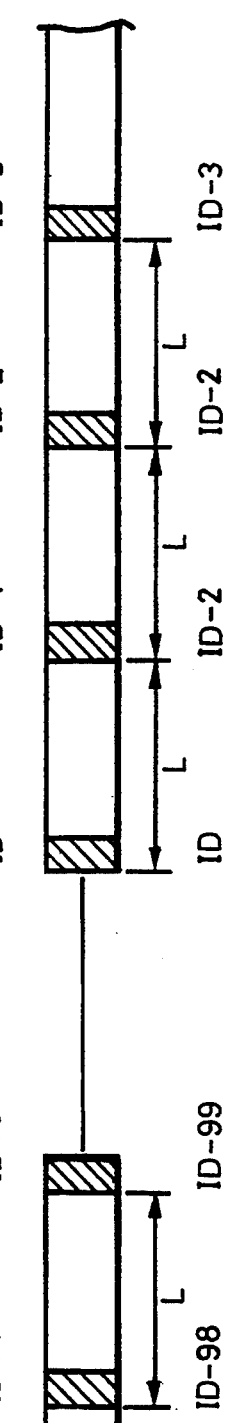
FIG. 8A (PRIOR ART)
FIG. 8B (PRIOR ART)
FIG. 8C (PRIOR ART)
FIG. 8D (PRIOR ART)

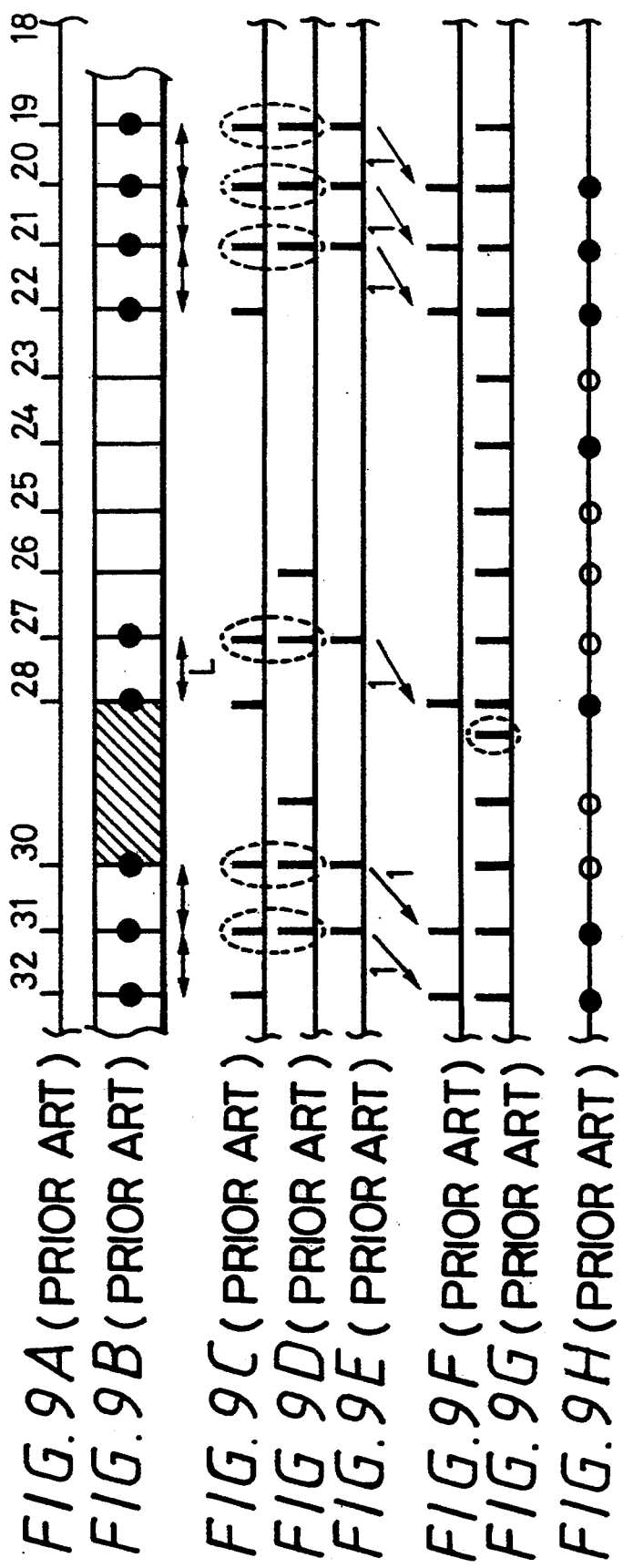

| Sync | SYNC 1 | SYNC 2 | Bit Shift Phase | |
|---|---|---|---|---|
| Value | 2E | D3 | | |
| Value | 0 1 1 1 0 1 0 0 | 1 1 0 0 1 0 1 1 | | |
| | N1 | | 1 1 1 0 1 | 1 |
| | N2 | | 1 1 0 1 0 | 2 |
| | N3 | | 1 0 1 0 0 | 3 |
| | N4 | | 0 1 0 0 1 | 4 |
| | N5 | | 1 0 0 1 1 | 5 |
| | N6 | | 0 0 1 1 0 | 6 |
| | N7 | | 0 1 1 0 0 | 7 |

FIG.15A

| ID0 | LD0 | LD1 | LD2 | LD3 | LD4 |
|-----|-----|-----|-----|-----|-----|
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| X | 1 | 0 | 0 | 0 | 0 |

FIG.15B

| ID0 | LD0 | LD1 | LD2 | LD3 | LD4 |
|-----|-----|-----|-----|-----|-----|
| 1 | 1 | 1 | 0 | 0 | 0 |
| 2 | 1 | 1 | 1 | 0 | 0 |
| 3 | 1 | 1 | 1 | 1 | 0 |
| 4 | 1 | 1 | 1 | 1 | 1 |
| 5 | 1 | 1 | 1 | 1 | 1 |
| X | 1 | 1 | 0 | 0 | 0 |

FIG.15C

| ID0 | LD0 | LD1 | LD2 | LD3 | LD4 |
|-----|-----|-----|-----|-----|-----|
| 1 | 1 | 1 | 1 | 0 | 0 |
| 2 | 1 | 1 | 1 | 1 | 0 |
| 3 | 1 | 1 | 1 | 1 | 1 |
| 4 | 1 | 1 | 1 | 1 | 1 |
| 5 | 1 | 1 | 1 | 1 | 1 |
| X | 1 | 1 | 1 | 0 | 0 |

FIG.15D

| ID0 | LD0 | LD1 | LD2 | LD3 | LD4 |
|-----|-----|-----|-----|-----|-----|
| 1 | 1 | 1 | 1 | 1 | 1 |
| 2 | 1 | 1 | 1 | 1 | 1 |
| 3 | 1 | 1 | 1 | 1 | 1 |
| 4 | 1 | 1 | 1 | 1 | 1 |
| 5 | 1 | 1 | 1 | 1 | 1 |
| X | 1 | 1 | 1 | 1 | 0 |

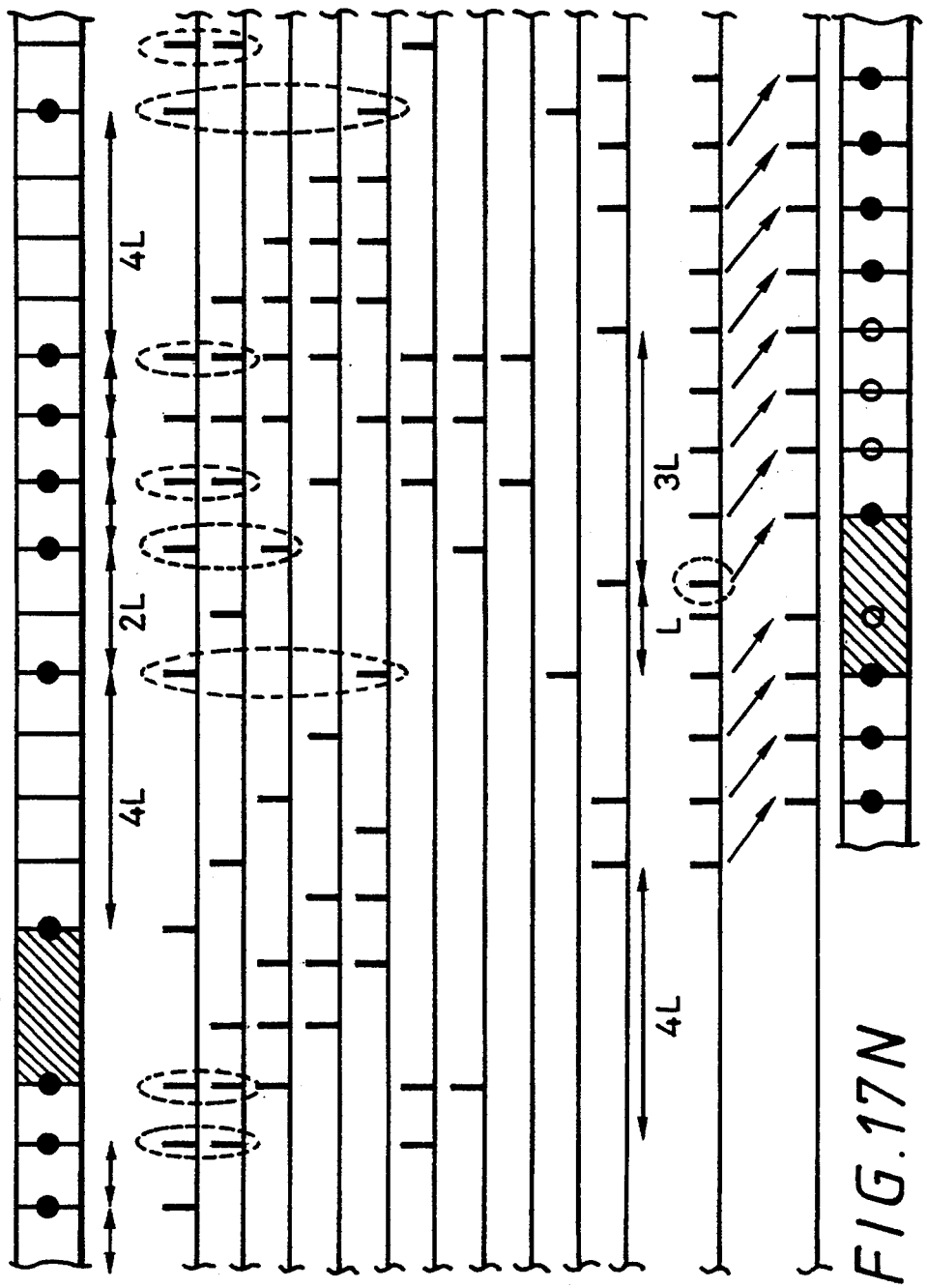

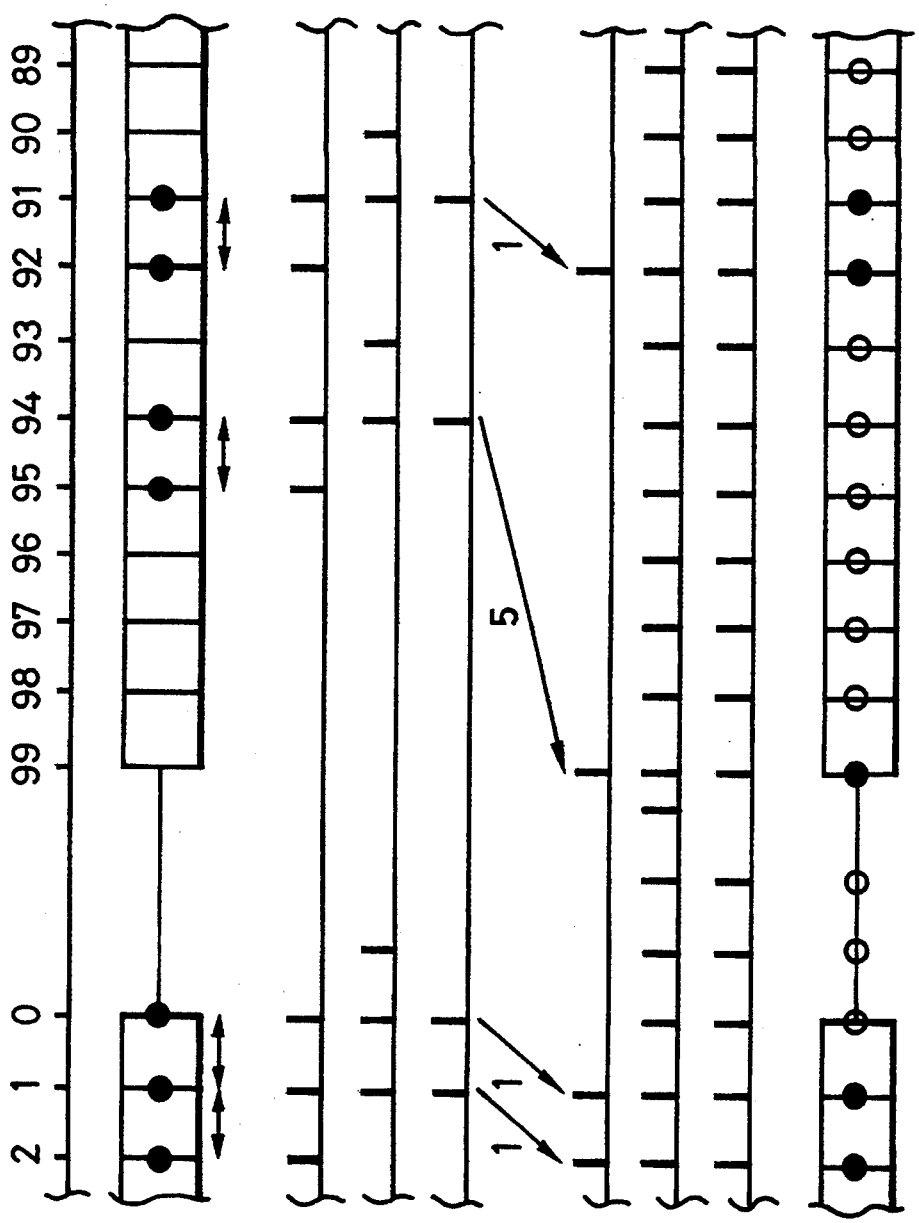

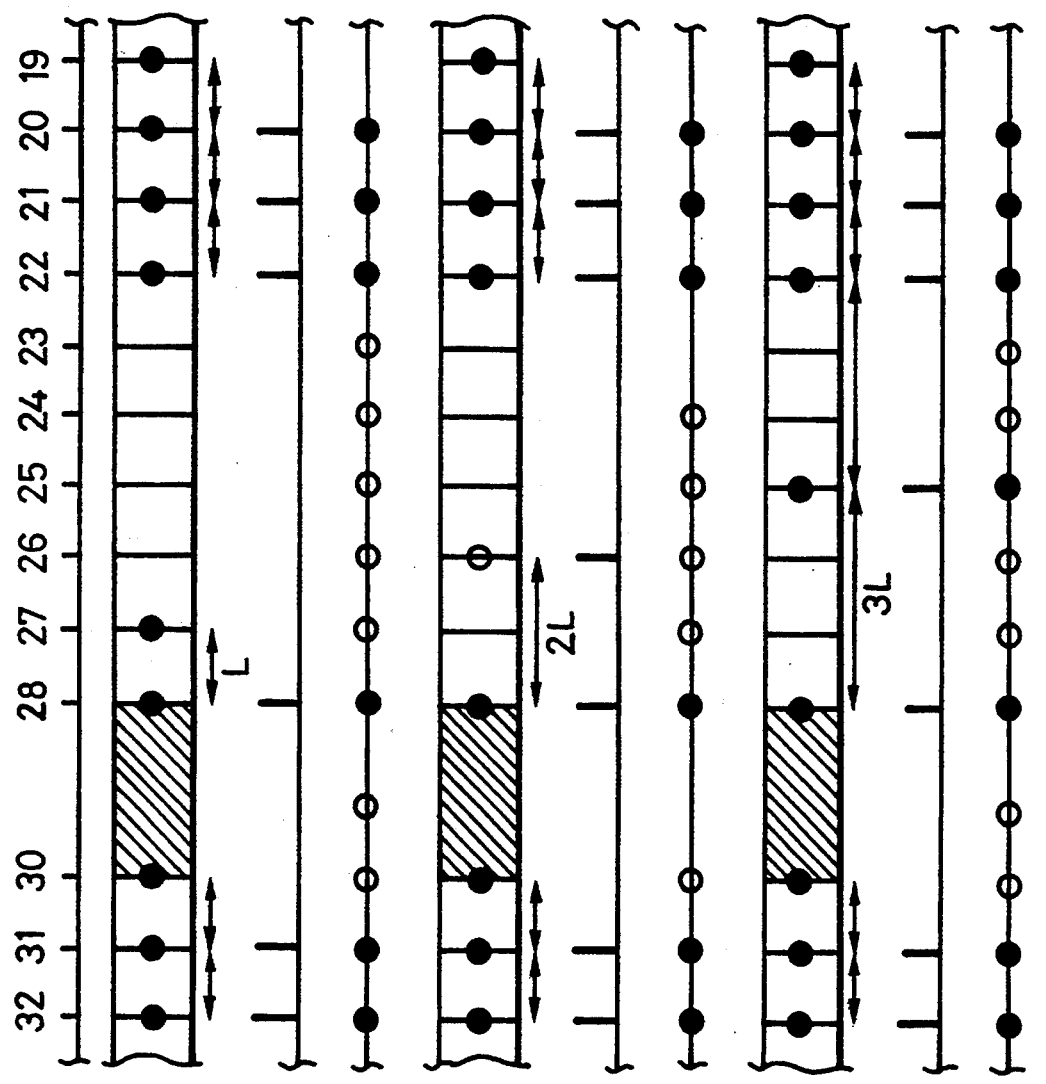

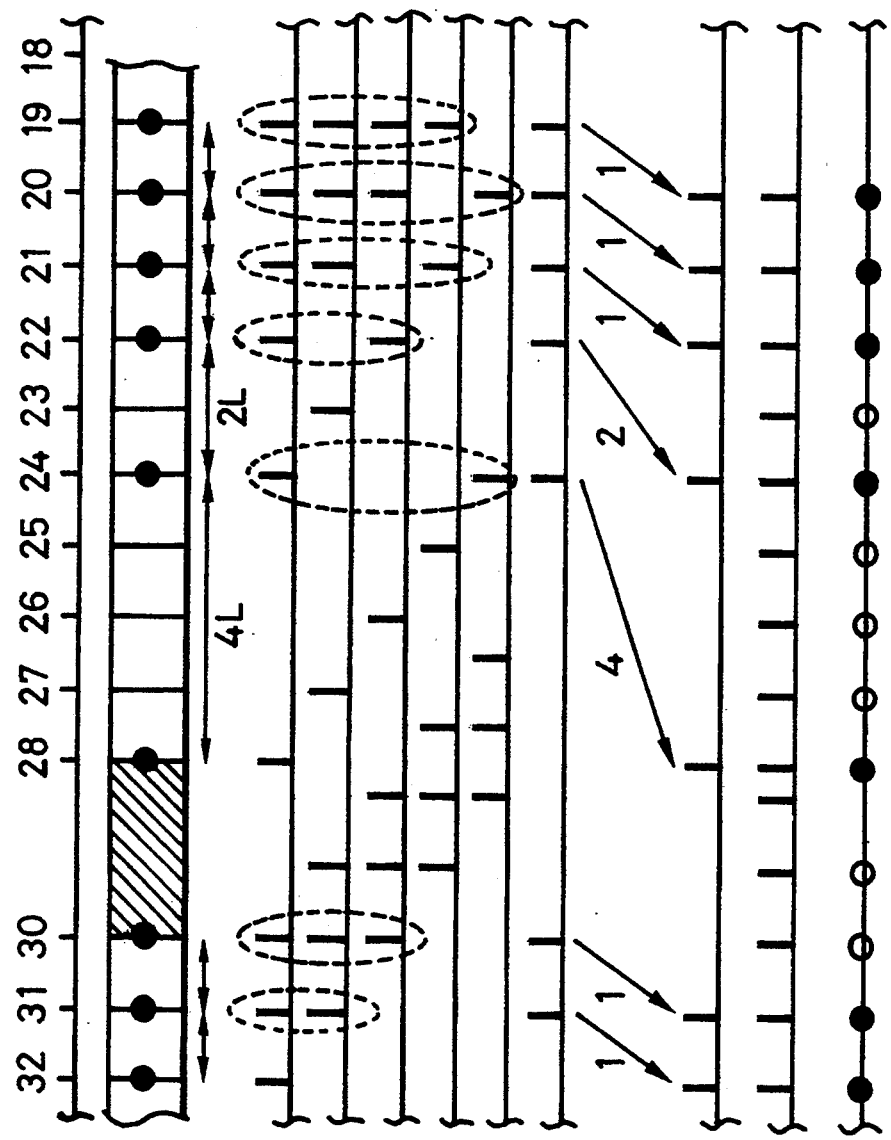

APPARATUS FOR GENERATING A SYNCHRONIZING SIGNAL

BACKGROUND OF THE INVENTION

1. Field of the Invention

The present invention relates to a synchronizing signal generator for use in an apparatus which detects a synchronizing signal of digital data.

2. Description of the Prior Art

Heretofore, digital data is comprised of sync. (synchronizing) pattern, data ID0 (ID number assigned to each of sync. blocks which will be described later on) and data ID1 (representing content of data) all of which are needed when digital data is reproduced. FIG. 1 of the accompanying drawings shows an arrangement of a conventional synchronizing signal generator for generating a synchronizing signal by detecting a sync. pattern of digital data, for example.

As shown in FIG. 1, digital data supplied from some suitable means, such as a reproducing system of a digital VTR (video tape recorder), not shown, or the like, is supplied to an input terminal 1. The digital data thus supplied to the input terminal 1 is supplied to a delay circuit 2, a variable shift register (VSR) 7 and a bit shift detector 6 which will be described later on. The delay circuit 2 delays the digital data supplied thereto through the input terminal 1 by a predetermined delay time L. Delayed data outputted from the delay circuit 2 is further delayed by a delay circuit 3 by a delay time 5L. A variable shift register (VSR) 4 latches therein output data Dx of the delay circuit 3 on the basis of a control signal supplied thereto from a bit shift phase corrector 16 which will be described later on. A latched output signal from the variable shift register 4 is supplied to some suitable means, such as the reproducing system of the digital VTR (not shown) or the like through an output terminal 5. The above predetermined delay time L has a duration corresponding to a length of one sync. block which will be described later on.

The bit shift detector 6 detects a bit shift amount of digital data D0 supplied thereto through the input terminal 1 on the basis of bit shift information contained in the sync. pattern which will be described later on. Detected shift amount data (referred to hereinafter simply as "signal" when necessary) PH0 representing a shift amount from the bit shift detector 6 is supplied to variable shift registers (VSRs) 7, 10 and the bit shift phase corrector 16 which will be described later on, respectively.

The variable shift register 7 bit-shifts the digital data D0 supplied thereto through the input terminal 1 on the basis of the shift amount data PH0 representing a shift amount from the bit shift detector 6. The variable shift register 10 bit-shifts digital data D1, delayed by the delay time L by the delay circuit 2, on the basis of the shift amount data PH0 representing a shift amount supplied thereto from the bit shift detector 6.

Shifted output data SD0, SD1 from the respective variable shift registers 7, 10 are supplied to sync/ID detectors 8, 11, respectively. The sync/ID detectors 8, 11 detect sync. patterns and ID data (ID0 and ID1) of the shifted output data SD0, SD1 supplied thereto from the variable shift registers 7, 10, i.e., the digital data supplied thereto through the input terminal 1 and the digital data D1 which results from delaying the digital data D0 by the delay time L by the delay circuit 2, and supply sync. patterns and ID data thus detected to a comparator 9.

The comparator 9 compares the sync. patterns and ID data supplied thereto from the sync/ID detectors 8, 11 and supplies a signal SY1 representing a compared result to a sync.position corrector 12. The sync. position corrector 12 supplies a correction signal for correcting a position of a synchronizing signal to the bit shift phase corrector 16 on the basis of the signal SY1 supplied thereto from the comparator 9 and the signal ID0 supplied thereto from the sync/ID detector 8. Also, the sync. position corrector 12 supplies a so-called inertia circuit 13 with a signal SYx. The inertia circuit 13 is what might be called a signal correcting circuit.

The bit shift phase corrector 16 generates a correction signal for effecting a bit shift on the basis of the signal SYx supplied thereto from the sync. position corrector 12 and supplies this correction signal to the variable shift register 4. Thus, the variable shift register 4 latches therein the digital data Dx supplied thereto from the delay circuit 3 and supplies the latched digital data Dx through the output terminal 5 to some suitable means, such as the reproducing system of the digital VTR (not shown) or the like.

The inertia circuit 13 generates a temporary synchronizing signal SYi on the basis of the signal SYx supplied thereto from the sync. position corrector 12, and supplies the temporary synchronizing signal SYi thus generated to a masking circuit 14. The masking circuit 14 masks temporary synchronizing signals SYi having a period shorter than the above predetermined delay time L and supplies other temporary synchronizing signal SYi through the output terminal 15 to some suitable means, such as the reproducing system of the digital VTR (not shown) or the like as a synchronizing signal SYm.

Inside circuit arrangements of the sync. position corrector 12 and the bit shift phase corrector 16 shown in FIG. 1 will be described below with reference to FIG. 2.

As shown in FIG. 2, the signal SY1 is supplied from the comparator 9 shown in FIG. 1 to an input terminal 50 as the compared output. The signal SY1 applied to the input terminal 50 is supplied to a sync. delay controller 55. The data ID0 is supplied to an input terminal 54 from the sync/ID detector 8 shown in FIG. 1.

The sync. delay controller 55 outputs signals LD0, LD1, LD2, LD3 and LD4 on the basis of the signal SY1 supplied thereto from the comparator 9 shown in FIG. 1 through the input terminal 50 and the signal ID0 supplied thereto from the sync/ID detector 8 shown in FIG. 1 through the input terminal 54. Relationship among the signals SY1, ID0 and signals LD0, LD1, LD2, LD3, LD4 outputted from the sync. delay controller 55 will be described below. When the signal SY1 is held at logic low "0" level, the signals LD0, LD1, LD2, LD3, LD4 are all held at logic low "0" level. When the signal SY1 is held at logic high "1" level, the signals LD0, LD1, LD2, LD3, LD4 are held at logic levels based on the values of the signal ID0, respectively. The sync. delay controller 55 includes a table for determining logic levels at which the signals LD0, LD1, LD2, LD3, LD4 are held in response to the logic level of the signal ID0.

Specifically, when the signal SY1 is held at logic high "1" level, the signals LD0, LD1, LD2, LD3, LD4 are held at the following logic levels in response to the values of the signal ID0 as shown on the table below:

TABLE

| IDO | LD0 | LD1 | LD2 | LD3 | LD4 |
|-----|-----|-----|-----|-----|-----|
| 1 | 1 | 0 | 0 | 0 | 0 |
| 2 | 1 | 1 | 0 | 0 | 0 |
| 3 | 1 | 1 | 1 | 0 | 0 |
| 4 | 1 | 1 | 1 | 1 | 0 |
| 5 | 1 | 1 | 1 | 1 | 1 |
| X | 1 | 0 | 0 | 0 | 0 |

The signal LD0 is supplied to a delay circuit 56 and a delay circuit 68 in the bit shift phase corrector 16 which will be described later on. The signal LD0 delayed by the delay circuit 56 is supplied to an adder 57. The signal LD1 is supplied to the adder 57 and a delay circuit 69 in the bit shift phase corrector 16. The adder 57 adds the signal LD1 from the sync. delay controller 55 and the output from the delay circuit 56, i.e., signal which results from delaying the signal LD0, and supplies a signal SL1 representing an added result to a delay circuit 58.

The added output signal that was outputted from the adder 57 is delayed by the delay circuit 58 and then fed to an adder 59. The signal LD2 from the sync. delay controller 55 is supplied to the adder 59 and the bit shift phase corrector 16 which will be described later on. The adder 59 adds the signal LD2 from the sync. delay controller 55 and the delayed output from the delay circuit 58, i.e., the signal which results from delaying the signal provided by adding the signal LD1 to the delayed signal of the signal LD0, and supplies a signal SL2 representing an added result thereof to a delay circuit 60.

The delay circuit 60 delays the added output of the adder 59 and supplies a delayed output to an adder 61. The signal LD3 outputted from the sync. delay controller 55 is supplied to the adder 61 and the bit shift phase corrector 16 which will be described later on. The adder 61 adds the signal LD3 supplied thereto from the sync. delay controller 55 to the delayed output from the delay circuit 60, i.e., the signal which results from delaying the signal obtained when the signal LD2 is added to the signal obtained after the signal LD1 had been added to the delayed signal of the signal LD0. The adder 61 supplies a signal SL3 representing an added result thereof to a delay circuit 62.

The delay circuit 62 delays the added output from the adder 61 and supplies a delayed output to an adder 63. The signal LD4 outputted from the sync. delay controller 55 is supplied to the adder 63 and the bit shift phase corrector 16. The adder 63 adds the signal LD4 supplied thereto from the sync. delay controller 55 to the delayed output supplied thereto from the delay circuit 62, the i.e., signal which results from delaying the signal obtained when the signal LD3 is added to the signal obtained after the signal LD2 had been added to the delayed signal of the signal provided by adding the signal LD1 to the delayed signal of the signal LD0. The adder 63 then supplies a signal SL4 representing an added result thereof to a delay circuit 64 and the bit shift phase corrector 16 which will be described later on.

The delay circuit 64 obtains the signal SYx by delaying the signal SL4 supplied thereto from the adder 63, and supplies the signal SYx through a delay circuit 66, the bit shift phase corrector 16 and an output terminal 65 to the inertia circuit 13 shown in FIG. 1.

The delay circuit 68 in the bit shift phase corrector 16 obtains a delay signal PL0 by delaying the signal SL0 (the same as the signal LD0 in FIG. 2) supplied thereto from the sync. delay controller 55 on the basis of the shift amount data PH0 representing the shifted amount supplied thereto from the bit shift detector 6 shown in FIG. 1, and supplies the signal PL0 to a delay circuit 69. The delay circuit 69 receives the signal SL1 from the adder 57 as an enable signal and obtains a signal PL1 by delaying the signal PL0 supplied thereto from the delay circuit 68 on the basis of the shift amount data PH0 representing the shifted amount supplied thereto from the input terminal 67. Then, the delay circuit 69 supplies the signal PL1 to a delay circuit 70.

The delay circuit 70 receives the signal SL2 from the adder 59 as an enable signal and obtains a signal PL2 by delaying the signal PL1 supplied thereto from the delay circuit 69 on the basis of the shift amount data PH0 representing the shifted amount supplied thereto through the input terminal 67. Then, the delay circuit 70 supplies the signal PL2 to a delay circuit 71. The delay circuit 71 receives the signal SL3 from the adder 61 as an enable signal and obtains a signal PL3 by delaying the signal PL2 supplied thereto from the delay circuit 70 on the basis of the shift amount data PH0 representing the shifted amount supplied thereto through the input terminal 67. Then, the delay circuit 71 supplies the signal PL3 to a delay circuit 72.

The delay circuit 72 receives the signal SL4 from the adder 63 as an enable signal and obtains a signal PL4 by delaying the signal PL3 supplied thereto from the delay circuit 71 on the basis of the shift amount data PH0 representing the shifted amount supplied thereto through the input terminal 67. Then, the delay circuit 72 supplies the signal PL4 to a delay circuit 73. The delay circuit 73 obtains a signal PL5 by delaying the signal PL4 supplied thereto from the delay circuit 72 in response to the signal SL5 supplied thereto from the delay circuit 64 of the sync. position corrector 12 as an enable signal, and supplies the signal PL5 to a delay circuit 74. The delay circuit 74 receives the signal SL6 from the delay circuit 66 as an enable signal and obtains a signal PHL by delaying the signal PL5 supplied thereto from the delay circuit 73, and supplies the signal PHL through an output terminal 75 to the variable shift register (VSR) 4 shown in FIG. 1.

Inside circuit arrangements of the delay circuits 69, 70, 71, 72, 73 and 74 shown in FIG. 2 and inside circuit arrangements of the inertia circuit 13 and the masking circuit 14 will be described below with reference to FIGS. 3A, 3B and FIG. 4.

FIG. 3A shows inside circuit arrangements of the delay circuits 69, 70, 71 and 72 shown in FIG. 2. As shown in FIG. 3A, a signal LDIN (collectively refers to the signals LD0, LD1, LD2, LD3, LD4 supplied from the sync. delay controller 55 in FIG. 2) is supplied to an input terminal 100. A signal SLIN (collectively refers to the signals SL0, SL1, SL2, SL3, SL4 supplied from the sync. delay controller 55 and the adders 57, 59, 61, 63 in FIG. 2) is supplied to an input terminal 101. Shift amount data PH0 representing a shifted amount (shift amount data PH0 representing the shifted amount supplied through the input terminal 67 in FIG. 2) is supplied to an input terminal 102. A signal PIN (collectively refers to the signals PL0, PL1, PL2, PL3 and PL4 in FIG. 2) is supplied to an input terminal 103. Further, a clock signal is supplied to an input terminal 107 from some suitable means, such as a body circuit of the VTR (not shown) or the like. The signals PL0 through PL4 shown in FIG. 2 are outputted from an output terminal 108. The delay circuit 68 is formed of a flip-flop circuit.

In the delay circuits 69 through 72 shown in FIG. 3A, the input terminal 102 to which the shift amount data PH0 representing the shifted amount is connected to one fixed contact 104a of a switch 104, and the input terminal 103 is connected to the other fixed contact 104b of the switch 104. A movable contact 104c of the switch 104 is connected to the other fixed contact 105b of a switch 105, and one fixed contact 105a of the switch 105 is connected to a non-inverting output terminal Q of a flip-flop circuit 106. A movable contact 105c of the switch 105 is connected to a data input terminal D of the flip-flop circuit 106, and the input terminal 107 is connected to a clock input terminal of the flip-flop circuit 106. The non-inverting output terminal Q of the flip-flop circuit 106 is connected to the output terminal 108. Moreover, the signal LDIN (the signals LD0, LD1, LD2, LD3 and LD4 supplied from the sync. delay controller 55 in FIG. 2) is supplied from the input terminal 100 to control operation of the switch 104. The signal SLIN (the signals SL0, SL1, SL2, SL3 and SL4 supplied from the sync. delay controller 55 and the adders 57, 59, 61 and 63 in FIG. 2) is supplied from the input terminal 101 to control operation of the switch 105.

The switch 104 connects the movable contact 104c to one fixed contact 104a when the signal LDIN supplied thereto from the input terminal 100 is held at logic high "1" level to thereby select the shift amount data PH0 representing the shifted amount supplied thereto through the input terminal 102. The switch 105 connects the movable contact 105c to the other fixed contact 105b when the signal SLIN supplied thereto from the input terminal 101 is held at logic high "1" level to thereby select the signal supplied thereto from the switch 104.

FIG. 3B shows an inside circuit arrangement of the inertia circuit 13 shown in FIG. 1. As shown in FIG. 3B, the inertia circuit 13 comprises an input terminal 110 to which the signal SYx from the sync. position corrector 12 shown in FIGS. 1 and 2 is supplied, a counter 111 which is reset in response to the signal SYx supplied thereto through the input terminal 111, an AND circuit 112 which performs the logical AND of the signal SYx supplied thereto from the input terminal 110 and the output of the counter 111 and an output terminal 113 from which an output of the AND circuit 112 is supplied to the masking circuit 114 shown in FIG. 1.

The inertia circuit 13 resets the counter 111 when the signal SYx is supplied thereto through the input terminal 110, and obtains an ORed output of the counter and the signal SYx, to thereby obtain the temporary synchronizing signal SYi having the predetermined period L. Then, the inertia circuit 13 supplies the temporary synchronizing signal SYi through the output terminal 113 to the masking circuit 14 shown in FIG. 1.

FIG. 4 shows an inside circuit arrangement of the masking circuit 14 shown in FIG. 1. As shown in FIG. 4, the masking circuit 14 comprises an input terminal 115 to which there is supplied the temporary synchronizing signal SYi from the inertia circuit 13 shown in FIG. 1, a counter 116 which begins counting after having been reset by the temporary synchronizing signal SYi supplied thereto from the input terminal 115, a flip-flop circuit 117 which latches therein the output of the counter 116, an OR circuit 118, a flip-flop circuit 119 which performs the logical AND of the output from the counter 116 and the output of the flip-flop circuit 117 and which supplies the ANDed output to a control terminal of the counter 116, and an output terminal 120 (the output terminal 15 from which the synchronizing signal SYm is outputted in FIG. 1) from which the output of the flip-flop circuit 117 is outputted.

Operation of the masking circuit 14 shown in FIG. 4 will be described with reference to FIG. 5 of a timing chart.

In FIG. 5, reference symbol m1 depicts the temporary synchronizing signal SYi supplied to a reset terminal reset of the counter 116 from the input terminal 115 shown in FIG. 4, m2 depicts a carry signal outputted from the counter 116, m3 depicts a latched output outputted from the non-inverting output terminal Q of the flip-flop circuit 117, m4 depicts a latched output outputted from the non-inverting output terminal Q of the flip-flop circuit 119, and m5 depicts a latched output outputted from the inverting output terminal of the flip-flop circuit 119 and which is supplied to the control terminal of the counter 116.

The counter 116 is reset when the signal M1 supplied to the reset terminal reset thereof goes to logic high level, and stops the counting when the signal m5 supplied to the control terminal thereof goes to logic low "0" level. Then, the counter 116 increments the count value and counts the clock pulse during the (L-1) period when the signal m5 supplied to the control terminal thereof goes to logic high "1" level.

When the signal m1 supplied through the input terminal 115 to the reset terminal reset of the counter 116 goes to logic high "1" level, the counter 116 is reset. The counter 116 counts the clock pulse of the (L-1) period when the signal m5 supplied to the control terminal thereof goes to logic high "1" level. Then, the counter 116 outputs the carry signal m2 shown in FIG. 5 after having counted the clock pulses of the (L-1) period.

The carry signal m2 is supplied to the data input terminal D of the flip-flop circuit 117. The flip-flop circuit 117 latches therein the carry signal m2 supplied thereto from the counter 116 in response to a system clock (not shown). A latched output outputted from the flip-flop circuit 117 becomes the latched output m3 shown in FIG. 5. The latched output m3 is outputted through the output terminal 120 as a signal Syi.

The carry signal m2 from the counter 116 is on the other hand supplied to the OR circuit 118, and the OR circuit 118 performs the logical OR of the carry signal m2 and the signal m4 outputted from the non-inverting output terminal Q of the flip-flop circuit 119. When the carry signal m2 is held at logic high "1" level and the signal m4 is held at logic low level, the output of the OR circuit 118 goes to logic high "1" level. Therefore, when the signal m1 is held at logic low level in the next clock, the output developed at the non-inverting output terminal Q of the flip-flop circuit 119 goes to logic high "1" level, and the output developed at the inverting output terminal Q thereof goes to logic low "0" level, causing the counter 16 to be disabled. When, however, the signal m1 of logic high "1" level is inputted thereto, the flip-flop circuit 119 is reset and the signal m5 goes to logic high "1" level, thereby energizing the counter 116.

The counter 116 is reset at the time the signal m1 is held at logic high "1" level. Then, during the period in which the signal m5 is held at logic high "1" level, the counter 116 counts the clock pulses. When the counter 116 counts the clock pulses of the (L-1) period, the counter 116 outputs the carry signal m2.

In the example of FIG. 5, the fourth pulse from the left of the signal m1 is masked by the masking circuit 14 shown in FIG. 1. Specifically, although the counter 116 is reset by the third pulse from the left of the signal m1 and is energized to start counting, the counter 116 is reset by the fourth pulse from the left of the signal m1 before counting the clock pulses of the (L-1) period. After the counter 116 was reset as described above, the counter 116 resumes the counting. When the counter 116 counts the clock pulses of the ( L-1) period, the counter 116 outputs the carry signal m2. According to the above-mentioned operation, the masking circuit 14 can mask the pulse having the period shorter than the (L-1) period.

An example of a format of the digital VTR will be described below with reference to FIGS. 6 and 7.

In FIG. 6, reference symbol SB depicts a format of one sync. block of the digital VTR. As shown in FIG. 6, one sync. block is comprised of sync. patterns SY0, SY1, ID data ID0, ID1, data D0, D1, ..., D161 and inner parities P0, P1, ..., P13. In this case, all elements except the sync. patterns SY0, SY1 constitute an inner code block.

FIG. 7 shows an example of the tape format of the digital VTR. As shown in FIG. 7, according to this example, one field is formed of six recording tracks (segments). Each segment is comprised of four audio sectors A1 through A4 provided at the center, servo tracking data S provided at the respective ends of the audio sectors A1 through A4 and video sectors V provided at the respective ends of the servo tracking data S. The audio sectors A1 through A4 are changed in arrangement at every two segments as shown in FIG. 7. Each sector is formed of a plurality of sync. blocks shown in FIG. 6.

Referring back to FIG. 6, the format of the sync. block of the digital VTR will be described below. FIG. 6 shows the ID data ID0 in correspondence with the sector arrangement shown in FIG. 7. The ID data ID0 represents the sync. block number having consecutive values to respective sync. blocks of the video sector V, the audio sectors A1 through A4 and the video sector V.

As shown in FIG. 6, the ID data ID is comprised of V/A representative of video sector or audio sector, TR representing a track number, SG representing a segment number, F representing a color frame and C/C representing a component signal or composite signal.

Continuity of data obtained when data is received will be described with reference to FIGS. 8A through 8D. In the following description, let it be assumed that ID in the digital data is decremented by "1" at every sync. pattern and that the sector has the same value within one block. Further, the sector is formed of video/audio data, track number data, two segment number data, two field number data and option flag data. Furthermore, since the data series is obtained by converting serial data into parallel data, bit must be shifted to the correct phase.

In FIGS. 8B through 8D, each of the hatched portions is comprised of sync. patterns (e.g., SYNC0, SYNC1), ID0, ID1 and data shown in FIG. 8A. ID0 and reference symbols L are shown in FIGS. 8B, 8C and 8D.

FIG. 8B shows the case that data is continuous upon reception. FIG. 8C shows the case that data is not continuous because the next data of the ID data ID+3 is lost when a tape is slackened or head is jumped. FIG. 8D shows the case that data is not continuous due to discontinuous point, such as a border of tracks of the VTR, a so-called edit gap produced as the border of video and audio recording areas or the like, for example.

When on the other hand a synchronizing signal is reproduced, a synchronizing error probability is increased as a byte error rate is deteriorated. Once the synchronizing signal is not reproduced, an error occurs at every synchronizing block, which further deteriorates the whole error rate. Specifically, when the byte error rate becomes deteriorated more than a synchronizing detection capability, error is increased in an avalanche fashion. Thus, it is to be noted that an error correction capability of the whole system depends upon the synchronizing detection capability rather than the error correction code capability. Therefore, considering balance between the synchronizing detection capability and the error correction code capability, it is to be noted that the high synchronizing detection capability should be provided as the byte error rate is deteriorated.

Operation of the conventional synchronizing signal generator shown in FIG. 1 will be described with reference to FIGS. 9A through 9H. In FIG. 9A, solid circles represent the case that the sync. pattern could be detected. In FIG. 9H, solid circles represent synchronizing signals obtained when the sync. pattern is detected continuously twice, and open circles represent synchronizing signals generated by the inertia circuit 13 and the masking circuit 14 shown in FIG. 1 when the sync. pattern is not detected continuously twice.

In the example shown in FIGS. 9A through 9H, it should be appreciated that a block in which the ID0 corresponds to "29" is dropped out.

When digital data shown in FIG. 9B is supplied, the sync. patterns shown by the solid circles in FIG. 9B are detected, and the detected sync. pattern shown in FIG. 9C is obtained. Then, the delay circuit 2 delays this detected sync. pattern by the delay time L and outputs the sync. pattern shown in FIG. 9D. The bit shift detector 6 obtains the shift amount data PH0 representing the shifted amount by detecting 5 bits from the digital data shown in FIG. 9B, and supplies the shift amount data PH0 representing the shifted amount to the variable shift registers 7, 10 and the bit shift phase corrector 16.

Digital data in which the sync. pattern is detected as shown in FIG. 9C is supplied to the variable shift register 7, and digital data in which the sync. pattern is detected as shown in FIG. 9D is supplied to the variable shift register 10.

The variable shift registers 7 and 10 bit-shift the digital data on the basis of the shift amount data PH0 representing the shifted amount supplied thereto from the bit shift detector 6 and supply the bit-shifted digital data to the sync/ID detectors 8 and 11. The sync/ID detectors 8 and 11 detect the sync. pattern and the ID data ID0, ID1 from the digital data supplied thereto from the variable shift registers 7, 10 and supply the sync. pattern and the data ID0, ID1 thus detected to the comparator 9.

The comparator 9 compares the sync. pattern and ID data ID0, ID1 supplied thereto from the sync/ID detectors 8 and 11, and supplies the signal SY1 representing the compared result to the sync. position corrector 12.

Specifically, the output shown in FIG. 9E is obtained by performing the logical AND of the sync. pattern shown in FIG. 9C and the sync. pattern shown in FIG. 9D. The sync. patterns encircled by dashed lines in FIGS. 9C and 9D are obtained at the same timing point. More specifically, the sync. pattern in which the sync. pattern is continuously obtained twice can be detected by comparing the sync. pattern and ID data ID0, ID1 supplied thereto from the sync/ID detectors 8, 11 by the comparator 9.

The sync. position corrector 12 bit-shifts the digital data supplied thereto from the delay circuit 3 on the basis of the compared result shown in FIG. 9E. Also, the sync. position corrector 12 determines on the basis of the value of the ID data ID0 whether or not the sync. pattern is located at the starting portion of the block. If the sync. pattern is detected during the period from the starting portion of the block to six sync. blocks, then the sync. position corrector 12 delays the sync. pattern SYx. The delayed sync. pattern SYx is illustrated in FIG. 9F.

The reason that the sync. pattern SYx should be delayed will be described below. The reason that the sync. position corrector 12 delays the sync. pattern SYx on the basis of the compared result shown in FIG. 9E is to use a sync. pattern of a block delayed from a sync. pattern of a certain block of the data delayed by the delay time 6L by the delay circuits 2 and 3.

This reason will be described in another way again with reference to FIGS. 9A through 9H. Since the block in which the ID0 is "29" is dropped out as shown in FIG. 9A, in order to reproduce data by reliably obtaining a synchronizing signal from the block in which the ID0 is "28", the sync. pattern SYx should be delayed by the delay time L on the basis of the compared result SY1 obtained when the Sync. pattern is detected from the block in which the ID0 is "27" as shown in FIG. 9A.

The sync. pattern SYx shown in FIG. 9F is supplied to the inertia circuit 13. The inertia circuit 13 is locked to the sync. pattern SYx shown in FIGS. 9F and outputs the temporary synchronizing signal SYi shown in FIG. 9G. The temporary synchronizing signal SYi is supplied to the masking circuit 14. The masking circuit 14 masks a temporary synchronizing signal having an interval shorter than the delay time L from the temporary synchronizing signal SYi supplied thereto from the inertia circuit 13. The masking operation of the masking circuit 14 is illustrated in FIG. 9H. In FIG. 9H, solid circles represent synchronizing signals obtained from the detected sync. patterns, and open circles represent temporary synchronizing signals which are generated by the inertia circuit 13 in correspondence with sync. patterns that could not be detected. Study of FIG. 9 reveals that the masking circuit 14 masks the temporary synchronizing signal whose interval is shorter than the delay time L as encircled by dashed lines in FIG. 9G. The synchronizing signal from the masking circuit 14 is supplied through the output terminal 15 to some suitable means, such as the reproducing system of the digital VTR or the like.

On the other hand, the digital data is delayed by the delay circuit 3 by the delay time 5L, for example, and then supplied to the variable shift register 4, in which it is bit-shifted by the correction signal supplied thereto from the bit shift phase corrector 16 to thereby correct the phase thereof. Thereafter, digital data whose border (i.e., portion corresponding to the dropped data ID "29") is bit-shifted and returned equivalently to the correct position, thereby being supplied through the output terminal 5 to some suitable means, such as the reproducing system of the digital VTR (not shown) or the like. Therefore, the reproducing system of the digital VTR (not shown) reproduces digital data on the basis of the digital data supplied thereto from the output terminal 5 and the synchronizing signal SYm supplied thereto through the output terminal 15.

The conventional synchronizing signal generator shown in FIG. 1 determines that the sync. pattern is detected when two adjacent sync. patterns are both determined values, a relationship of data ID0 representing the synchronizing signal is represented by "+1" and also when the data ID1 representing the content of the data of the synchronizing block is the same. Then, the synchronizing signal generator locks the inertia circuit 13.

How the conventional synchronizing signal generator shown in FIG. 1 operates when two sync. patterns become erroneous will be described below with reference to FIGS. 10A through 10J.

FIG. 10A shows the values of ID0 similarly to FIG. 9A. FIGS. 10B, 10C and 10D show the case that the sync. pattern of the block number having the ID0 data value of "27" cannot be detected, FIGS. 10E, 10F and 10G show the case that the sync. patterns of blocks having the ID0 data values of "27", "26" cannot be detected, and FIGS. 10H, 10I and 10J show the case that the sync. patterns of blocks having ID data values of "27", "26" and "25" cannot be detected, respectively.

As shown in FIG. 10B, when the sync. pattern of the block having the ID0 value "27" cannot be detected, the comparator 9 determines that a block corresponding to "28" of the ID0 value and the adjacent block, i.e., the sync. pattern of the block having "27" of ID0 value, i.e., ID0 and ID1 are not coincident with each other. Thus, the comparator 9 outputs a compared output shown in FIG. 10C, and the inertia circuit 13 outputs the temporary synchronizing signal SYi shown in FIG. 10D. In FIG. 10D, solid circles represent detected sync. patterns, open circles represent synchronizing signals obtained from the sync. patterns generated by the inertia circuit 13, and "X" represent errors, i.e., the case that a synchronizing signal is not outputted.

As shown in FIG. 10E, when neither of the sync. patterns of the blocks in which the values of the ID0 are "27" and "26" are detected, the comparator 9 determines that the sync. pattern of block corresponding to "28" of the ID0 and two blocks adjacent to the former block, i.e., the sync. patterns of the blocks corresponding to "27" and "26" of the ID0, ID0 and ID1 are not coincident with each other. As s consequence, the comparator 9 outputs a compared output shown in FIG. 10F and the inertia circuit 13 outputs a synchronizing signal shown in FIG. 10G. In FIG. 10G, solid circles represent synchronizing signals obtained from detected sync. patterns, open circles represent synchronizing signals generated from the inertia circuit 13, and "X" represent errors, i.e,, the case that a synchronizing signal is not outputted.

As shown in FIG. 10H, when the sync. patterns of blocks in which values of ID0 are "27", "26" and "25" are not detected at all, the comparator 9 determines that the sync. pattern of the block corresponding to "28" of the ID0 value and the sync. patterns of three blocks adjacent to the former block, i.e., sync. patterns of blocks corresponding to "27", "26" and "25" of ID0 values, i.e., ID0 and ID1 are not coincident with each other. Consequently, the comparator 9 outputs a compared output shown in FIG. 10I and the inertia circuit 13 outputs a temporary synchronizing signal SYi shown in FIG. 10J. In FIG. 10J, solid circles represent synchronizing signals obtained from the sync. patterns that could be detected, open circles represent synchronizing signals generated from the inertia circuit 13 and "X" represent errors, i.e, the case that a synchronizing signal is not outputted.

In other words, when two sync. patterns or more become erroneous continuously, data provided in the interval that is not synchronized all become erroneous. As shown by the open circles in FIGS. 10D, 10G and 10J, once the synchronization is established, the synchronizing signal can be generated by the inertia circuit 13. It is the border of the block shown in FIG. 8D that causes a serious problems if the synchronization is not established.

The assignee of the present application has previously proposed a synchronizing signal extracting apparatus (see Japanese laid-open patent publication No. 60-137150). According to this previously-proposed synchronizing signal extracting apparatus, since a synchronizing output signal is obtained under the condition that synchronizing signals of the portions of incoming video signals are coincident with each other in timing and that address data are coincident with each other in content, it is possible to sufficiently reduce the probability in actual practice to the extent that a data portion of the same pattern as that of the synchronizing signal occurred at the time synchronizing signal data arrives will not be erroneously determined as the synchronizing signal.

Furthermore, the assignee of the present application has previously proposed a synchronizing signal detecting apparatus (see Japanese laid-open patent publication No. 1- 188132). According to this previously-proposed synchronizing signal detecting apparatus, incoming serial data is converted into parallel data, and a phase at which data pattern of a synchronizing signal is assumed to exist is detected from the parallel data. Then, the parallel data is shifted on the basis of the detected phase and a synchronizing signal is detected from the shifted data. Therefore, the synchronizing signal can be detected at lower speed and the circuit arrangement of this synchronizing signal detecting apparatus can be simplified.

Since, however, the above conventional synchronizing signal generator treats only the adjacent sync. patterns, a probability (sync. error rate) that the synchronizing signal cannot be detected is considerably large and cannot cope with the error correction capability.

The sync. error rate will be described below. A probability (byte error rate Psync) that 4 bytes of sync. pattern (SYNC2, ID1, SEC1) will cause an error is expressed by the following equation (1):

$$Psync = 4 \times Pbyte \quad (1)$$

where Pbyte represents the byte error rate.

Accordingly, when a signal is delayed by 6 sync. blocks and detected at the starting portion of the block, a probability that a synchronizing error will occur in the starting portion of the block, i.e., a synchronizing signal cannot be detected is expressed by the following equation (2):

$$Pse = (Psync)^6 + (Psync)^5 \times (1 - Psync) \times 6 + \quad (2)$$
$$(Psync)^4 \times (1 - Psync)^2 \times 10 + (Psync)^3 \times$$
$$(1 - Psync)^3 \times 4$$

The byte error rate $Pbyte = 3 \times 10^{-3}$. Also, assuming that the border of block, for example, occurs 1800 time per second, then a number Nb at which a synchronization is not established at the border of block is expressed by the following equation (3):

$$Nb = 1/1800/Pse \quad (3)$$
$$= 1.3 \text{ (minutes)}$$

This value of 1.3 (minutes) is a level which causes a serious problem in actual practice. Therefore, according to the conventional synchronizing signal generator of the system that treats only the adjacent sync. patterns, there is then the disadvantage that the probability of synchronizing error is considerably large.

OBJECTS AND SUMMARY OF THE INVENTION

It is therefore an object of the present invention to provide a synchronizing signal generating apparatus in which the aforesaid shortcomings and disadvantages encountered with the prior art can be eliminated.

It is another object of the present invention to provide a synchronizing signal generating apparatus in which a probability (sync. error rate) that a sync. pattern cannot be detected can be suppressed to be small.

According to a first aspect of the present invention, there is provided a synchronizing signal generating apparatus for generating a synchronizing signal from digital data in which a synchronizing signal formed of a fixed data pattern having a predetermined bit number is inserted at a predetermined time interval L. The synchronizing signal generating apparatus is comprised of a delay circuit for obtaining a plurality of digital data having a delay time of n times (n is a positive integer) as long as the predetermined time interval L by delaying the digital data at the unit of the time interval L, a bit shift detector for detecting a phase coincident with the fixed data pattern by delaying the digital data at the bit unit, a plurality of bit shifters for bit-shifting a plurality of digital data outputted from the delay circuit in response to detected result of the bit shift detector, a plurality of synchronizing detectors for detecting whether or not a plurality of digital data bit-shifted by the plurality of bit shifters and the fixed data pattern are coincident with each other, and a synchronizing signal generating circuit for generating a synchronizing signal in response to an output signal of the synchronizing detectors which detected coincidence between the digital data and the fixed data pattern.

According to a second aspect of the present invention, there is provided a synchronizing signal generating apparatus for generating a synchronizing signal from digital data in which a synchronizing signal formed of a fixed data pattern having a predetermined bit number is inserted at a predetermined time interval L and in which an identification number whose value is changed at every predetermined time interval L is inserted. The synchronizing signal generating apparatus is comprised of a delay circuit for obtaining a plurality of digital data having a delay time of n times (n is a positive integer) as long as the predetermined time interval L by delaying the digital data at the unit of the time interval L, a bit shift detector for detecting a phase coincident with the fixed data pattern by delaying the digital data at the bit unit, a plurality of bit shifters for bit-shifting a plurality of digital data outputted from the delay circuit in response to detected result of the bit shift detector, a plurality of synchronizing detectors for detecting whether or not a plurality of digital data bit-shifted by the plurality of bit shifters, the fixed data pattern and the identification number whose value changes in response to the time interval L are coincident with one another, and a synchronizing signal generating circuit for generating a synchronizing signal in response to an output signal of the synchronizing detector which detected coincidence among the digital data, the fixed data pattern and the identification number.

In accordance with a third aspect of the present invention, there is provided a synchronizing signal generating apparatus for generating a synchronizing signal from digital data in which a synchronizing signal formed of a fixed data pattern having a predetermined bit number is inserted at a predetermined time interval L, a first identification number whose value changes at every predetermined time interval L and second identification number whose value is the same at the data unit of the same content at every predetermined time interval L. The synchronizing signal generating apparatus is comprised of a delay circuit for obtaining a plurality of digital data having a delay time of n times (n is a positive integer) as long as the predetermined time interval L by delaying the digital data at the unit of the time interval L, a bit shift detector for detecting a phase coincident with the fixed data pattern by delaying the digital data at the bit unit, a plurality of bit shifters for bit-shifting a plurality of digital data outputted from the delay circuit in response to detected result of the bit shift detector, a plurality of synchronizing detectors connected to the plurality of bit shifters for detecting whether or not a plurality of digital data bit-shifted by the plurality of bit shifters, the fixed data pattern, the first identification number whose value changes in response to the time interval L and the second identification number are coincident with one another, and a synchronizing signal generating circuit for generating a synchronizing signal in response to an output signal of the synchronizing detector which detected coincidence of the digital data, the fixed data pattern, the first identification number and the second identification number.

The above and other objects, features, and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 8A through 8D are diagrams showing a format of digital data, and to which reference will be made in explaining disadvantages brought about when digital data is reproduced;

FIGS. 9A through 9H are timing charts used to explain operation of the conventional synchronizing signal generator;

FIGS. 10A through 10J are timing charts used to explain operation of the conventional synchronizing signal generator;

FIG. 12 is a diagram used to explain the sync. pattern;

FIGS. 15A through 15D are tables used to explain operation of the main portion of the synchronizing signal generator according to the present invention;

FIGS. 17A through 17N are timing charts used to explain operation of the synchronizing signal generator according to the present invention;

FIGS. 18A through 18I are timing charts used to explain how the synchronizing signal generator according to the present invention operates when delay amounts are changed;

FIGS. 19A through 19J are timing charts used to explain how the synchronizing signal generator according to the present invention operates when the sync. pattern is not detected over the periods L, 2L and 3L; and FIGS. 20A through 20K are timing charts used to explain how the synchronizing signal generator according to the present invention operates when the sync. pattern cannot be detected over the periods 4L, 2L and L.

DETAILED DESCRIPTION OF THE PREFERRED EMBODIMENT

Figure 1:
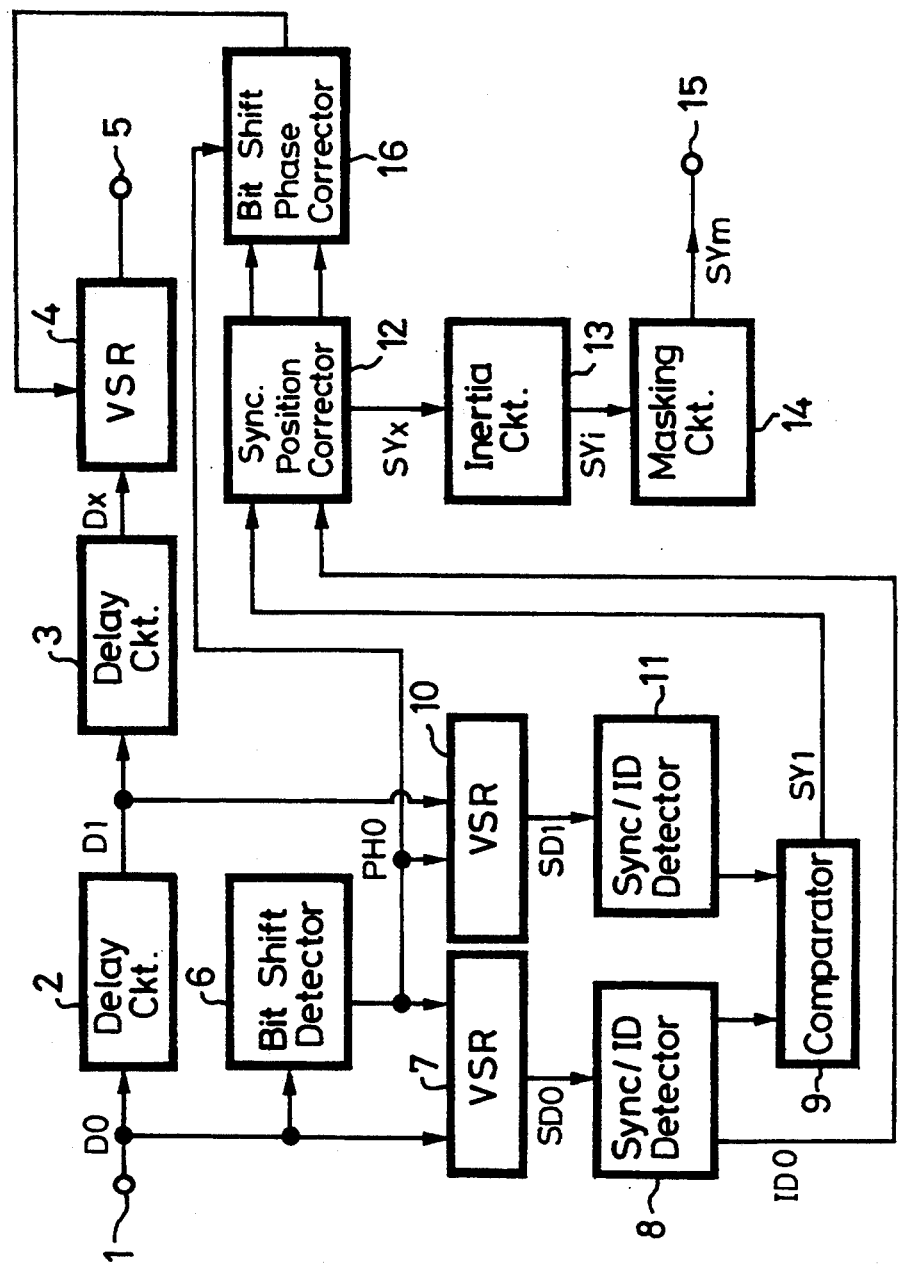
FIG. 1 is a block diagram showing an example of a conventional synchronizing signal generator.
Figure 11:
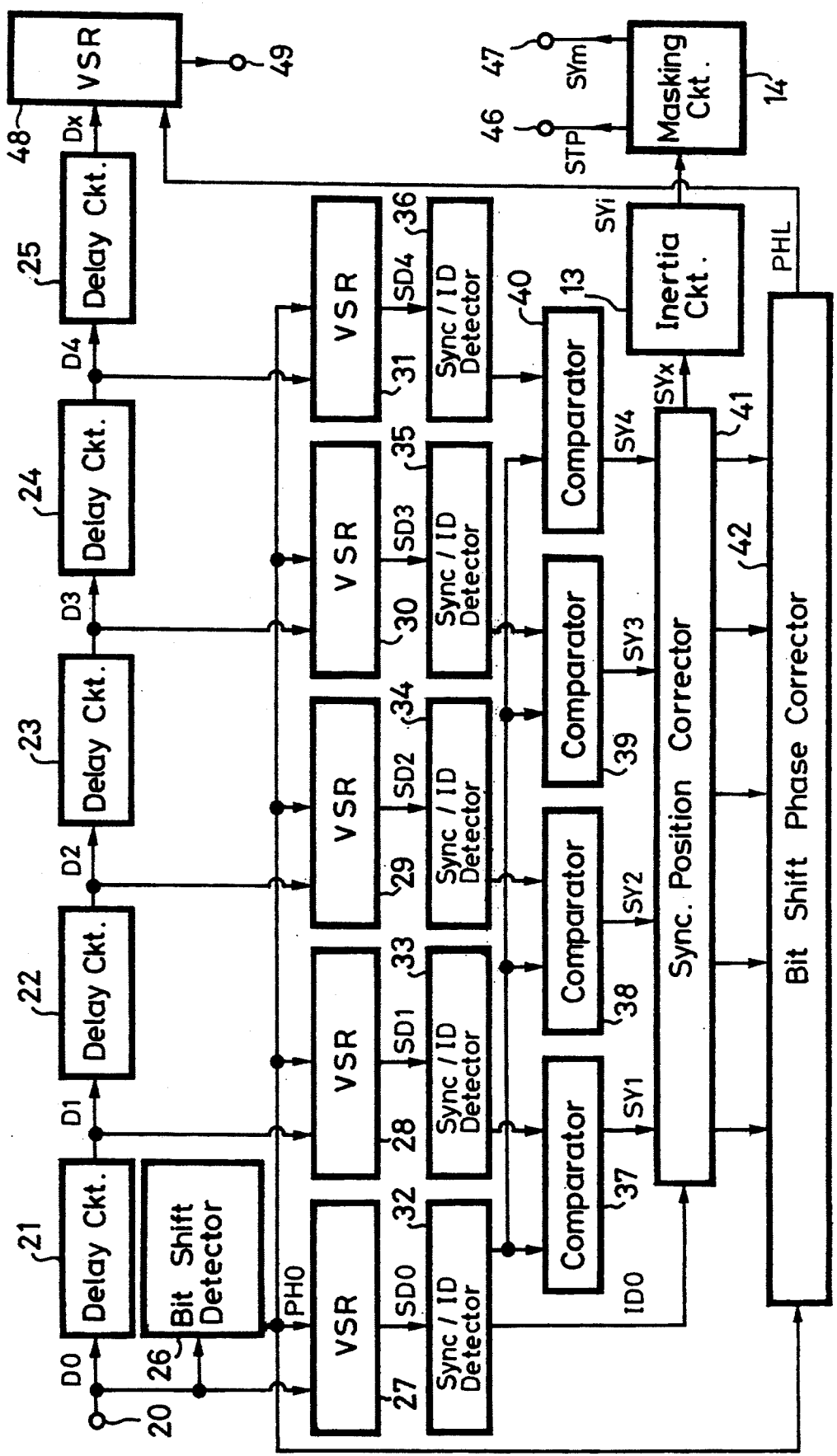
FIG. 11 is a block diagram showing a synchronizing signal generator according to an embodiment of the present invention.

A synchronizing signal generator according to an embodiment of the present invention will now be described in detail with reference to FIG. 11. In FIG. 11, like parts corresponding to those of FIG. 1 are marked with the same references and therefore need not be described in detail.

As shown in FIG. 11, there is provided an input terminal 20 to which there is supplied the digital data D0 from some suitable means, such as the reproducing system of the digital VTR (not shown) or the like. Delay circuits 21, 22, 23 and 24 delay input data by the predetermined delay time L and output delayed data. A delay circuit 25 delays input data by the predetermined delay time L and outputs delayed data. As shown in FIG. 11, the delay circuits 21, 22, 23, 24 and 25 are connected in series and the output terminal of the delay circuit 25 provided at the final stage is connected to an input terminal of the variable shift register (VSR) 48.

Variable shift registers (VSRs) 27, 28, 29, 30 and 31 obtain signals SD0, SD1, SD2, SD3 and SD4 by latching therein the digital data D0 supplied thereto from the input terminal 20 and the signals D1, D2, D3 and D4 supplied thereto from the delay circuits 21, 22, 23 and 24 on the basis of the shift amount data PH0 representative of the shift amount supplied thereto from the bit shift detector 26. Output signals SD0, SD1, SD2, SD3 and SD4 from the variable shift registers (VSRs) 27, 28, 29, 30 and 31 are supplied to sync./ID detectors 32, 33, 34, 35 and 36, respectively.

A relationship between the sync. pattern and the bit shift phase and how to detect the bit shift phase by the bit shift detector 26 will be described with reference to FIG. 12. In this case, let us describe the case that, of the sync. patterns, SYNC1 is set to "2E" and SYNC2 is set to "D3", by way of example.

In binary-coded notation, "2E" is expressed as "01110100" and "D3" is expressed as "11001011". In this embodiment, the bit shift detector 26 is adapted to detect the leading 5 bits of the sync. pattern. Accordingly, when the phase is shifted by 1 bit as shown by an arrow N1 in FIG. 12, the leading 5 bits of the sync. pattern become "11101" and the bit shift phase at that time becomes 1 bit as shown on the rightmost first column of FIG. 12.

When the phase is shifted by 2 bits as shown by an arrow N2 in FIG. 12, the leading 5 bits of the sync. pattern become "11010" and the bit shift phase at that time becomes 2 bits as shown on the rightmost second column of FIG. 12.

When the phase is shifted by 3 bits as shown by an arrow N3 in FIG. 12, the leading 5 bits of the sync. pattern become "10100" and the bit shift phase at that time becomes 3 bits as shown in the rightmost third column of FIG. 12.

When the phase is shifted by 4 bits as shown by an arrow N4 in FIG. 12, the leading 5 bits of the sync. pattern become "01001" and the bit shift phase at that time becomes 4 bits as shown in the rightmost fourth column of FIG. 12.

When the phase is shifted by 5 bits as shown by an arrow N5 in FIG. 12, the leading 5 bits of the sync. pattern becomes "10011" and the bit shift phase at that time becomes 5 bits as shown in the rightmost fifth column of FIG. 12.

When the phase is shifted by 6 bits as shown by an arrow N6 in FIG. 12, the leading 5 bits of the sync. pattern becomes "00110" and the bit shift phase at that time becomes 6 bits as shown in the rightmost sixth column of FIG. 12.

Furthermore, when the phase is shifted by 7 bits as shown by an arrow N7 in FIG. 12, the leading 5 bits of the sync. pattern becomes "01100" and the bit shift phase at that time becomes 7 bits as shown in the rightmost seventh column of FIG. 12.

Specifically, the bit shift detector 26 detects the bit shift amount and generates the shift amount data PH0 representing the shifted amount of bits.

How to pick up data in response to the bit shift phase will be described with reference to FIG. 13.

The variable shift registers (VSRs) 27, 28, 29, 30 and 31 shown in FIG. 11 carry out a so-called variable shift operation in such a way as to change the pick-up position of data on the basis of the shift amount data PH0 supplied thereto from the bit shift detector 26.

Figure 13:
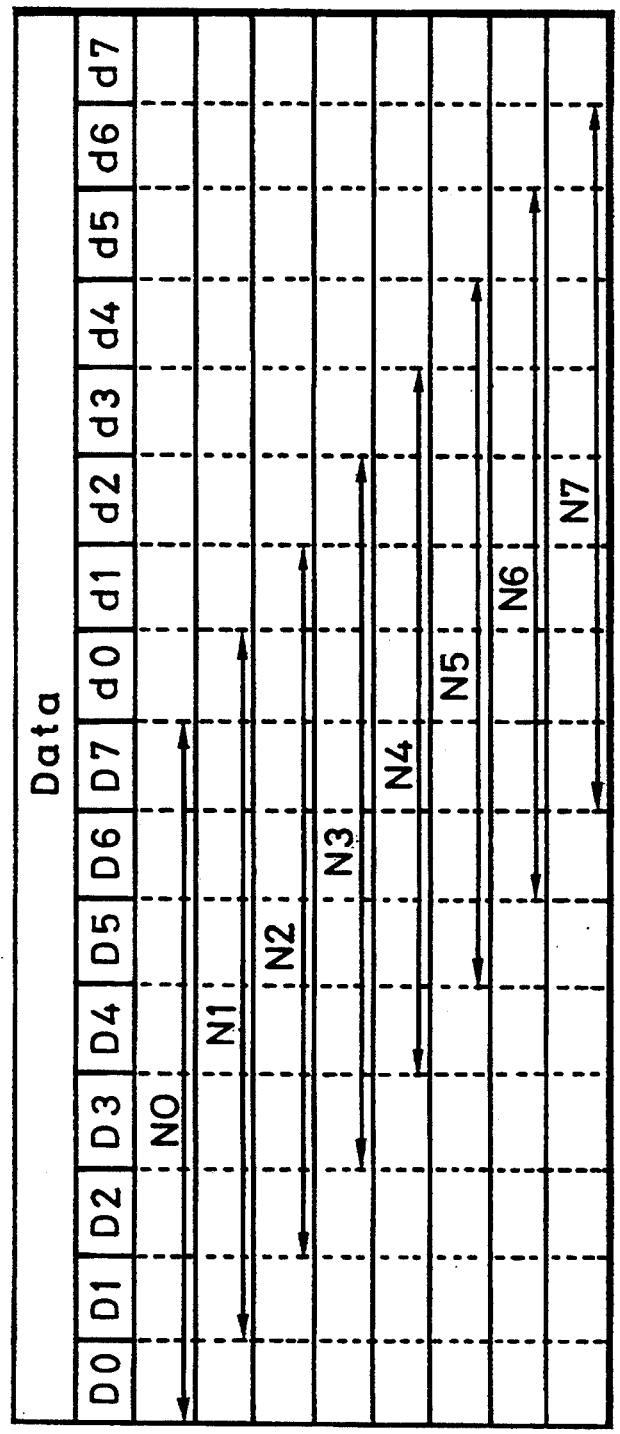
FIG. 13 is a diagram used to explain position at which data are selected in response to the bit shift phase.

In FIG. 13, an arrow N0 represents a shift amount "0", an arrow N1 represents a shift amount "1", an arrow N2 represents a shift amount "2", an arrow N3 represents a shift amount "3", an arrow N4 represents a shift amount "4", an arrow N5 represents a shift amount "5", an arrow N6 represents a shift amount "6", and an arrow N7 represents a shift amount "7", respectively.

More specifically, the arrow N0 represents how to pick up data when the shift amount data PH0 representing the shift amount from the bit shift detector 26 shows the shift amount "0". As shown by the arrow N0, input data D0 through d7 are not shifted and then outputted as they are, i.e., the input data D0 through d7 are used as they are.

The arrow N1 represents how to pick up data when the shift amount data PH0 representing the shift amount from the bit shift detector 26 shows the shift amount "1". As shown by the arrow N1, the input data D0 through d7 are shifted by 1 bit and the input data D1 through d0 are picked up and then used.

The arrow N2 represents how to pick up data when the shift amount data PH0 representing the shift amount from the bit shift detector 26 shows the shift amount "2". As shown by the arrow N2, the input data D0 through d7 are shifted by 2 bits and the input data D2 through d1 are picked up and then used.

The arrow N3 represents how to pick up data when the shift amount data PH0 representing the shift amount from the bit shift detector 26 shows the shift amount "3". As shown by the arrow N3, the input data D0 through d7 are shifted by 3 bits and the input data D3 through d2 are picked up and then used.

The arrow N4 represents how to pick up data when the shift amount data PH0 representing the shift amount from the bit shift detector 26 shows the shift amount "4". As shown by the arrow N4, the input data D0 through d7 are shifted by 4 bits and the input data D4 through d3 are picked up and then used.

The arrow N5 represents how to pick up data when the shift amount data PH0 representing the shift amount from the bit shift detector 26 shows the shift amount "5". As shown by the arrow N5, the input data D0 through d7 are shifted by 5 bits and the input data D5 through d4 are picked up and then used.

The arrow N6 represents how to pick up data when the shift amount data PH0 representing the shifted amount from the bit shift detector 26 shows the shift amount "6". As shown by the arrow N6, the input data D0 through d7 are shifted by 6 bits and the input data D6 through d5 are picked up and then used.

The arrow N7 represents how to pick up data when the shift amount data PH0 representing the shift amount from the bit shift detector 26 shows the shift amount "7". As shown by the arrow N7, the input data D0 through d7 are shifted by 7 bits and the input data D7 through d6 are picked up and then used.

The sync/ID detectors 32, 33 detect sync. patterns, ID data and sector data of the signals SD0, SD1 supplied thereto from the variable shift registers 27, 28, and supply the sync. patterns, ID data and sector data thus detected to comparators 37, 38, 39 and 40, respectively. Also, the sync/ID detectors 32, 33 supply the data ID0 and ID1 to a sync. position corrector 41.

The sync/ID detectors 34, 35, 36 detect sync. patterns, data ID0, ID1 of the signals SD2, SD3, SD4 supplied thereto from the variable shift registers 29, 30, 31 and supply the sync.patterns, data ID0, ID1 thus detected to the comparators 38, 39, 40, respectively.

The comparator 37 obtains the signal SY1 representing the compared result by comparing the sync. pattern, data ID0, ID1 supplied thereto from the sync/ID detector 32 with the sync. pattern, data ID0, ID1 supplied thereto from the sync/ID detector 33, and supplies the signal SY1 to the sync. position corrector 41.

The comparators 38, 39, 40 obtain the signals SY2, SY3, SY4 representing compared results by comparing the sync. patterns, data ID0, ID1 supplied thereto from the sync/ID detectors 38, 39, 40 with the sync. pattern, data ID0, ID1 supplied thereto from the sync/ID detector 32, and supply the signals SY2, SY3, SY4 to the sync. position corrector 41.

More specifically, the comparator 38 outputs a signal of logic high "1" level when the sync. patterns from the sync/ID detectors 38, 39 become coincident with each other, a difference between the data ID0 from the sync/ID detectors 38, 39 is and when data ID1 from the sync/ID detectors 38, 39 become coincident with each other.

The comparator 39 outputs a signal of logic high level when the sync. patterns from the sync/ID detectors 34, 35 become coincident with each other, a difference between data ID0 from the sync/ID detectors 34, 35 is "1" and when data ID1 from the sync/ID detectors 34, 35 become coincident with each other.

The comparator 40 outputs a signal of logic high level when the sync. patterns from the sync/ID detectors 35, 36 become coincident with each other, a difference between data ID0 from the sync/ID detectors 35, 36 is "1" and when data ID1 from the sync/ID detectors 35, 36 become coincident with each other.

The sync. position corrector 41 corrects the synchronizing position on the basis of the data ID0, ID1 supplied thereto from the sync/ID detector 32 and the signals SY1, SY2, SY3, SY4 supplied thereto from the comparators 37, 38, 39, 40, and supplies a corrected result to the bit shift phase corrector 42.

The bit shift phase corrector 42 obtains a signal PHL by correcting the bit shift phase on the basis of the shift amount data PH0 representing the shift amount supplied thereto from the bit shift detector 26 and the output of the sync. position corrector 41, and supplies the resultant signal PHL to the variable shift register 48.

Figure 3A:
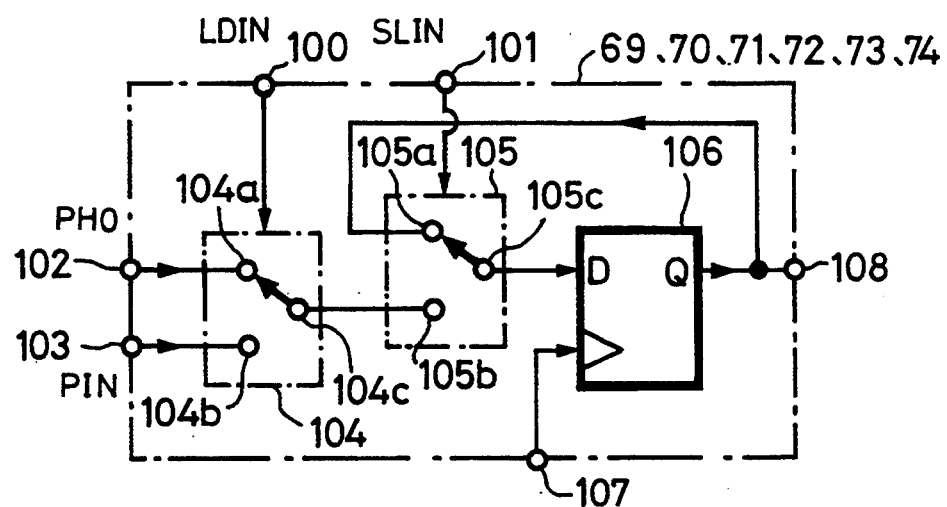
FIG. 3A is a schematic block diagram showing inside circuit arrangements of the delay circuits shown in FIG. 2.
Figure 3B:
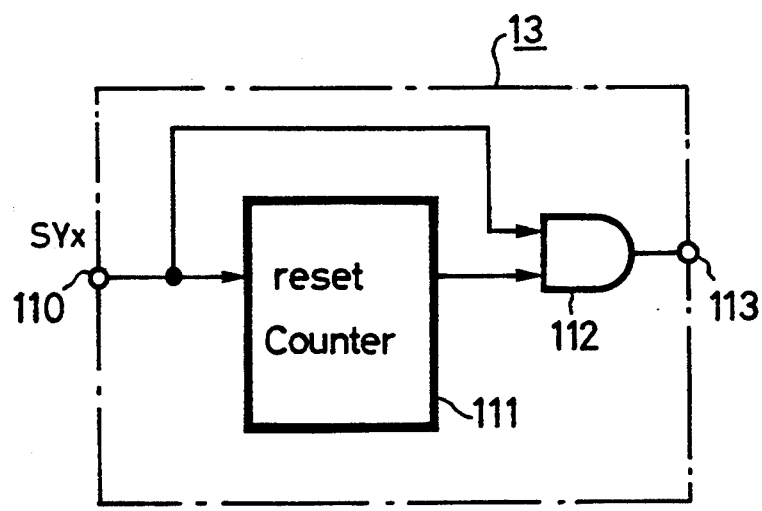
FIG. 3B is a schematic block diagram showing an inside circuit arrangement of the inertia circuit shown in FIG. 1.
Figure 4:
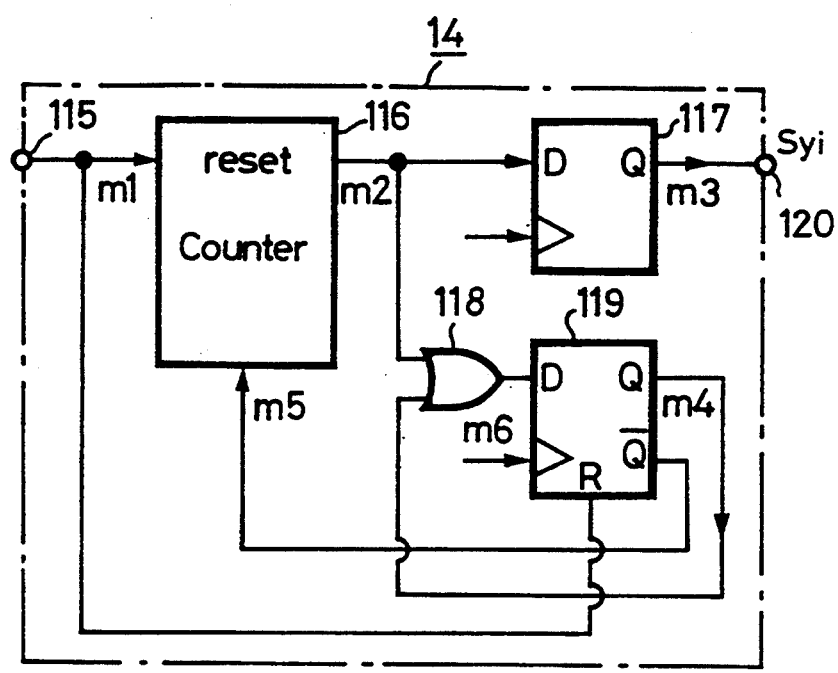
FIG. 4 is a schematic block diagram showing an inside circuit arrangement of the masking circuit shown in FIG. 1.
Figure 5:
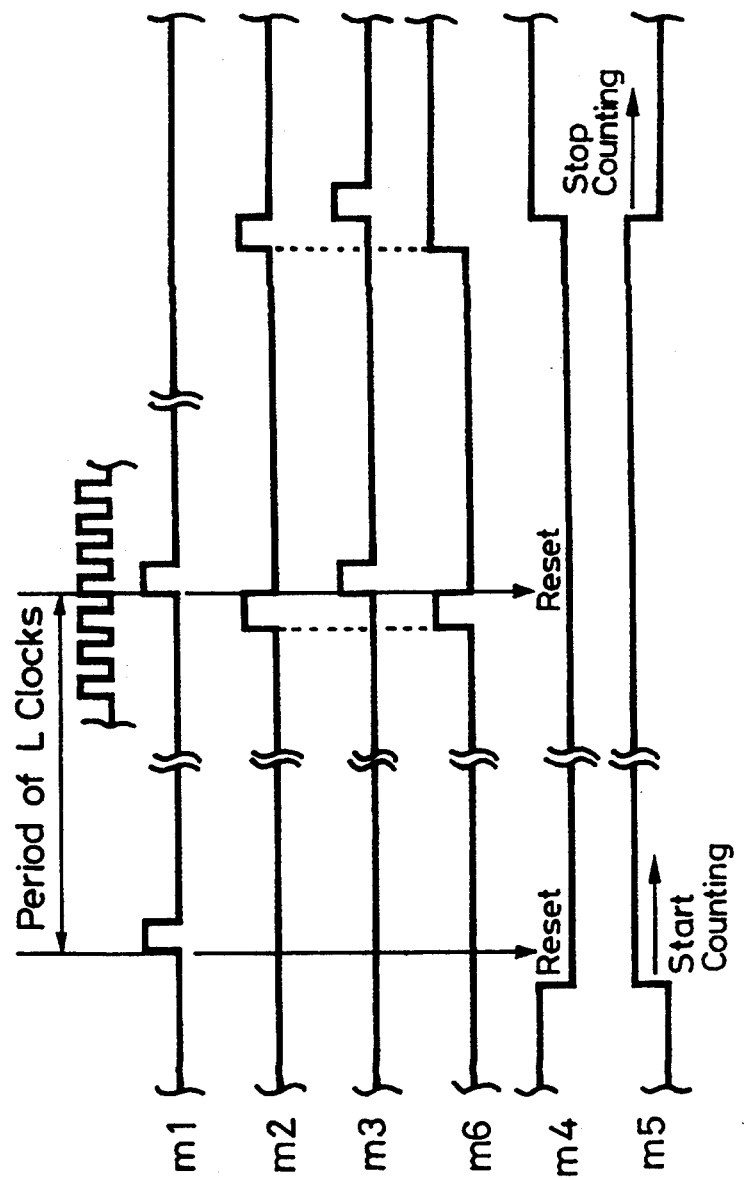
FIG. 5 is a timing chart used to explain operation of the masking circuit shown in FIG. 4.
Figure 6:
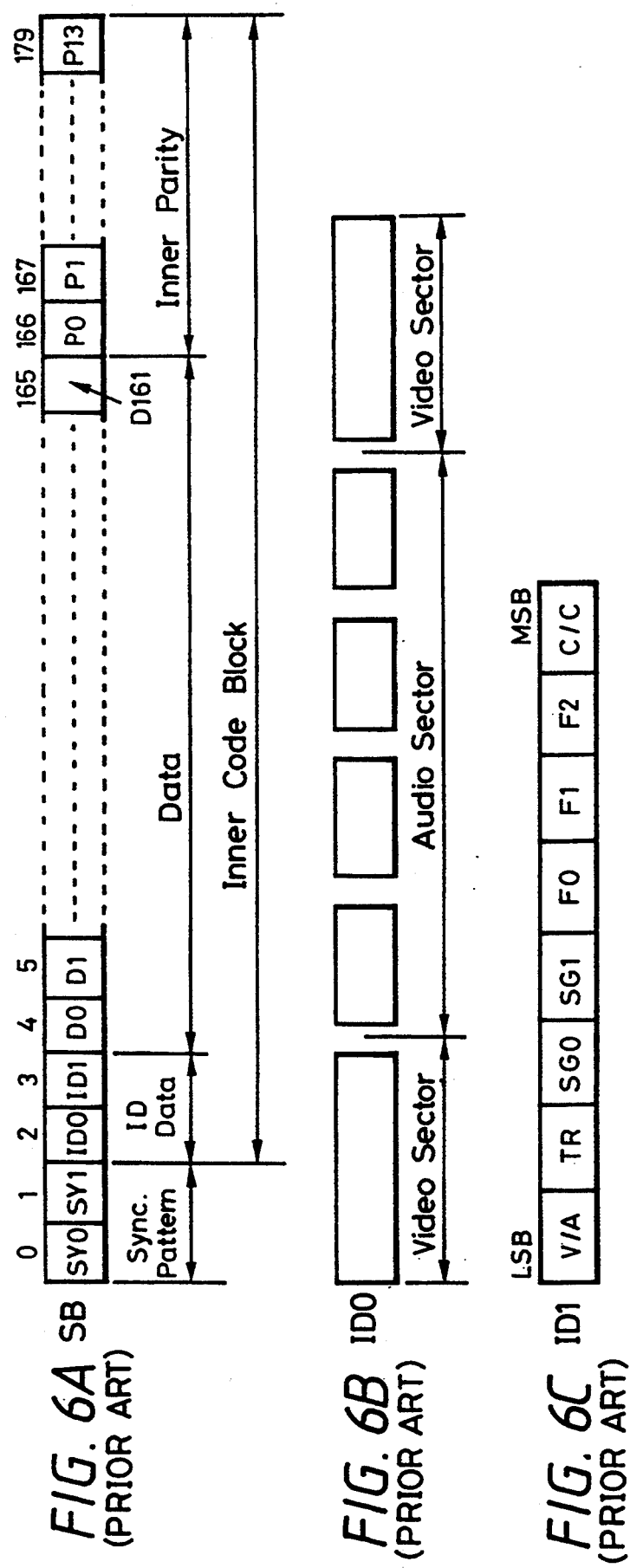
FIG. 6 is a diagram used to explain the conventional synchronizing signal generator and illustrating an example of format of a digital VTR.
Figure 7:
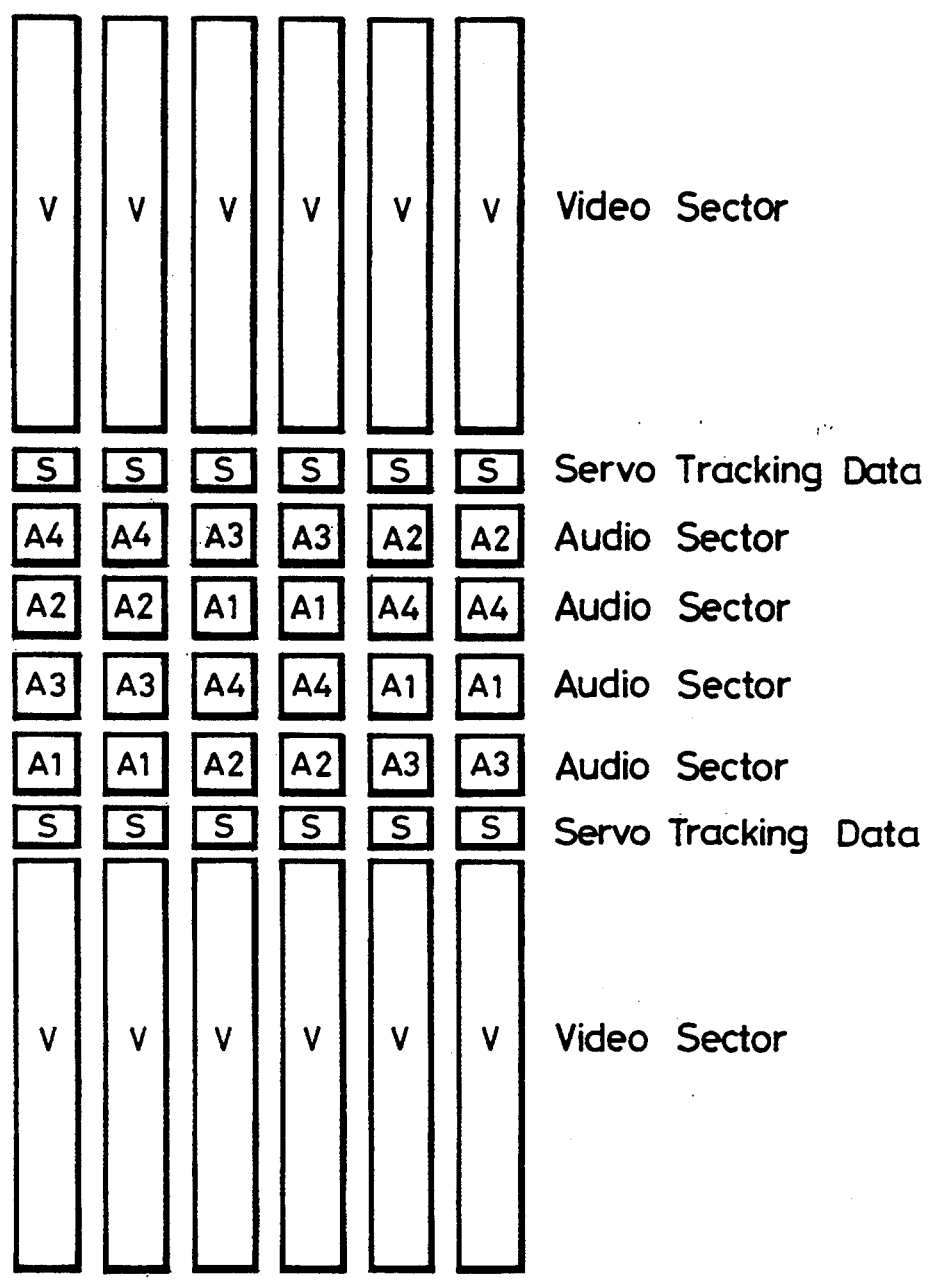
FIG. 7 is a diagram used to explain the conventional synchronizing signal generator and illustrating a tape format of the digital VTR.

The variable shift register 48 latches therein the output of the delay circuit 25 on the basis of the signal PHL supplied thereto from the bit shift phase corrector 42, and supplies the latched output through an output terminal 49 to other circuits of the VTR (not shown) or the like. The inertia circuit 13 and the masking circuit 14 are arranged in the same way as those of the conventional synchronizing signal generator shown in FIG. 1, and therefore need not be described. Furthermore, the inside circuit arrangements of the inertia circuit 13 and the masking circuit 14 also are made the same as those shown in FIGS. 3 and 4.

Figure 14:
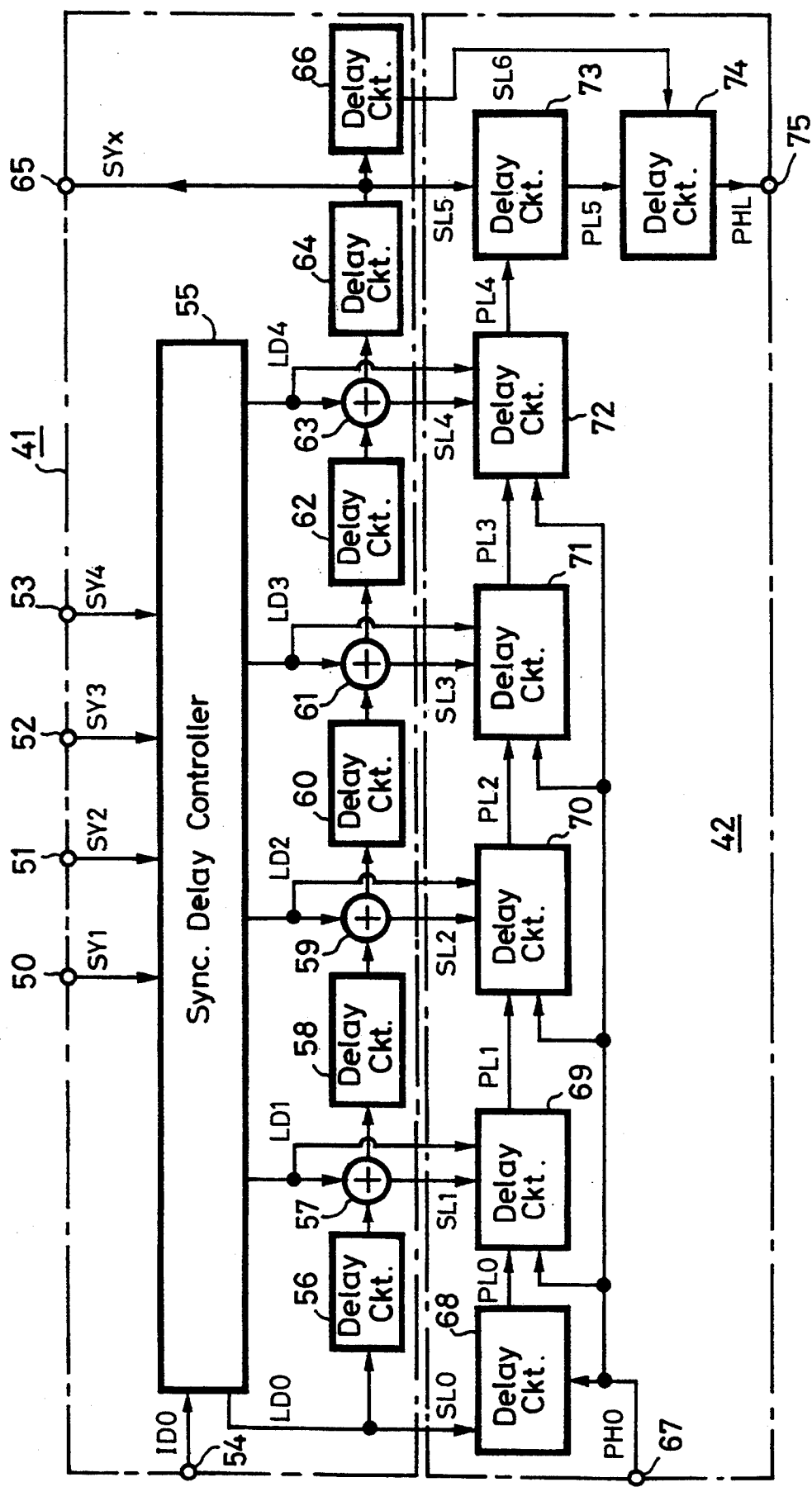
FIG. 14 is a block diagram showing inside circuit arrangements of a sync. position corrector and a bit shift phase corrector.

Inside circuit arrangements of the sync. position corrector 41 and the bit shift phase corrector 42 shown in FIG. 11 will be described below with reference to FIG. 14. In FIG. 14, like parts corresponding to those of FIG. 2 are marked with the same references and therefore need not be described in detail.

As shown in FIG. 14, the signal SY1 representing the compared result obtained from the comparator 37 shown in FIG. 11 is supplied to an input terminal 50. The signal SY2 representing the compared result obtained from the comparator 38 shown in FIG. 11 is supplied to an input terminal 51. The signal SY3 representing the compared result obtained from the comparator 39 shown in FIG. 11 is supplied to an input terminal 52. The signal SY4 representing the compared result obtained from the comparator 40 shown in FIG. 11 is supplied to an input terminal 53.

Figure 2:
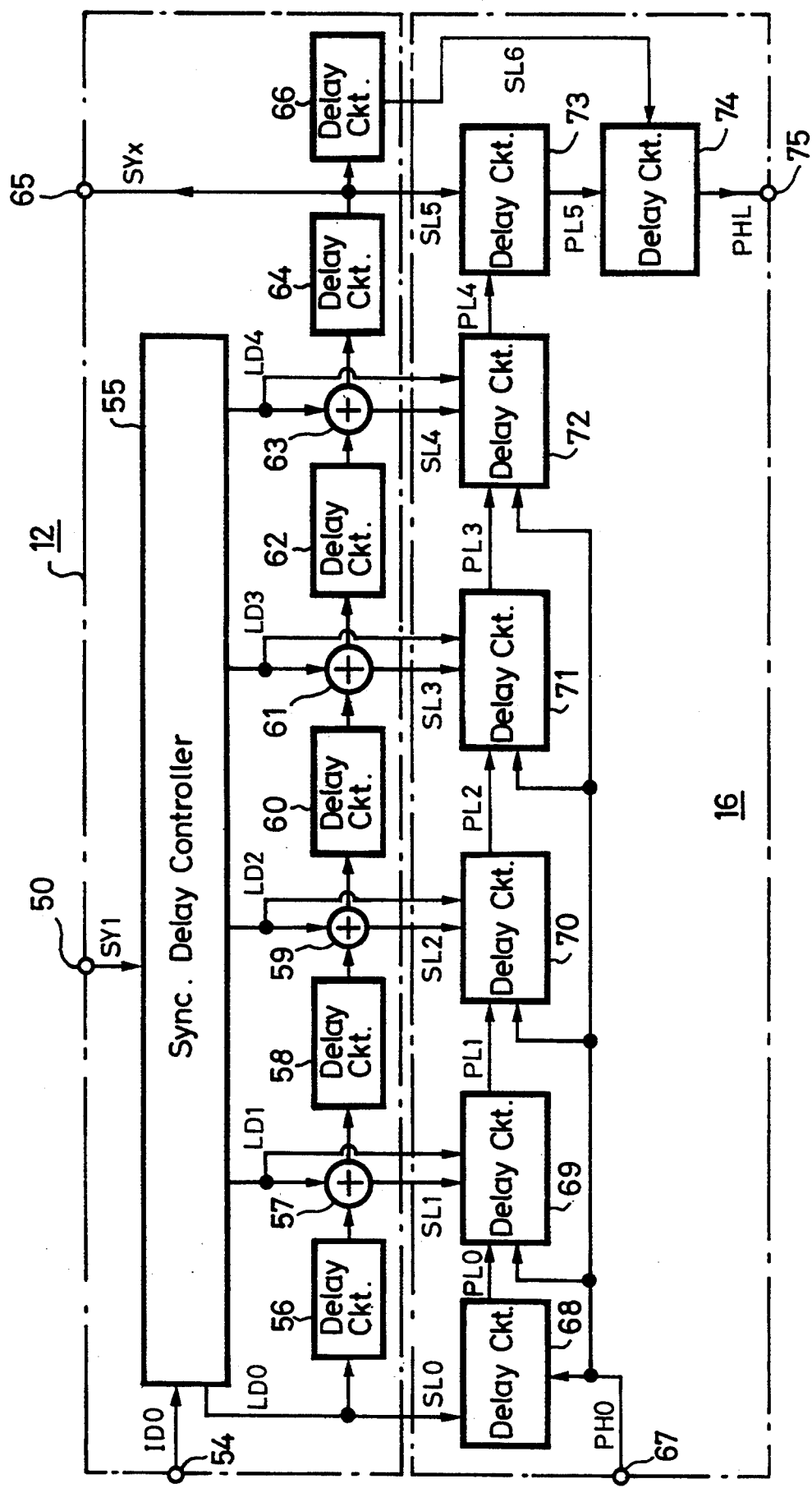
FIG. 2 is a block diagram showing a main portion of the conventional synchronizing signal generator shown in FIG. 1.

The sync. position corrector 41 and the bit shift phase corrector 42 shown in FIG. 14 are different from the sync. position corrector 9 and the bit shift phase corrector 13 shown in FIG. 2 in the input terminals 50 through 53. As will be clear from FIGS. 1 and 2, according to this embodiment, sync. patterns having time intervals L through 4L are detected. Specifically, when the time intervals of the detected two sync. patterns are L, 2L, 3L and 4L, it is determined that correct sync. patterns are obtained, and then the inertia circuit 13 is initialized. A portion in which sync. pattern is not obtained is compensated by the signal outputted from the inertia circuit 13.

Operation of the sync. position corrector 41 and the bit shift phase corrector 42 will be described with reference to FIGS. 15A through 15D.

When the signal SY1 supplied through the input terminal 50 shown in FIG. 14 from the comparator 37 shown in FIG. 11 is held at logic high "1" level, the state shown in FIG. 15A is presented. More specifically, as shown in FIG. 15A, when the signal ID0 supplied through the input terminal 54 from the sync/ID detector 32 is "1", the signal LD0 goes to logic high "1" level and the signals LD1 through LD4 go to logic low level, respectively. When the signal ID0 is "2", the signals LD0 and LD1 go to logic high "1" level and the signals LD2 through LD4 go to logic low "0" level, respectively. When the signal ID0 is "3", the signals LD0 through LD2 go to logic high "1" level and the signal LD3 and LD4 go to logic low "0" level, respectively. When the signal ID0 is "4", the signals LD0 through LD3 go to logic high "11" level and the signal LD4 goes to logic low "0" level, respectively. When the signal ID0 is "5", the signals LD0 through LD4 go to logic high "1" level. When the signal ID0 is "x", the signal LD0 goes to logic high "1" level and the signals LD1 through LD4 go to logic low level, respectively.

When the signal SY2 supplied to the input terminal 51 shown in FIG. 14 from the comparator 38 is held at logic high "1" level, the state shown in FIG. 15B is presented. More specifically, as shown in FIG. 15B, when the signal ID0 supplied through the input terminal 54 from the sync/ID detector 32 is "1", the signals LD0 and LD1 go to logic high "1" level and the signals LD2 through LD4 go to logic low "0" level, respectively. When the signal ID0 is "2", the signals LD0 through LD2 go to logic high "1" level and the signals LD3, LD4 go to logic low "0" level, respectively. When the signal ID0 is "3", the signals LD0 through LD3 go to logic high "1" level and the signal LD4 goes to logic low "0" level, respectively. When the signal ID0 is "4", the signals LD0 through LD4 go to logic high "1" level. When the signal ID0 is "5", the signals LD0 through LD4 go to logic high "1" level. When the signal ID0 is "x", the signals LD0 and LD1 go to logic high "1" level and the signals LD2 through LD4 go to logic low "0" level, respectively.

When the signal SY3 supplied to the input terminal 52 shown in FIG. 14 from the comparator 39 is held at logic high "1" level, the state shown in FIG. 15C is presented. More specifically, as shown in FIG. 15C, when the signal ID0 supplied through the input terminal 54 shown in FIG. 14 from the sync/ID detector 32 is "1", the signals LD0 through LD2 go to logic high "1" level and the signals LD3 and LD4 go to logic low "0" level, respectively. When the signal ID0 is "2", the signals LD0 through LD3 go to logic high "1" level and the signal LD4 goes to logic low "0" level, respectively. When the signal ID0 is "3", the signals LD0 through LD4 go to logic high "1" level. When the signal ID0 is "4", the signals LD0 through LD4 go to logic high "1" level. When the signal ID0 is "5", the signals LD0 through LD4 go to logic high "1" level. When the signal ID0 is "x", the signals LD0 through LD2 go to logic high "1" level and the signals LD3 and LD4 go to logic low "0" level, respectively.

When the signal SY4 supplied to the input terminal 52 shown in FIG. 14 from the comparator 39 is held at logic high "1" level, the state shown in FIG. 15D is presented. More specifically, as shown in FIG. 15D, when the signal ID0 supplied through the input terminal 54 shown in FIG. 14 from the sync/ID detector 32 is "1", the signals LD0 through LD3 go to logic high "1" level and the signal LD4 goes to logic low "0" level, respectively. When the signal ID0 is "2", the signals LD0 through LD4 go to logic high "1" level. When the signal ID0 is "3", the signals LD0 through LD4 go to logic high "1" level. When the signal ID0 is "4", the signals LD0 through LD4 go to logic high "1" level. When the signal ID0 is "5", the signals LD0 through LD4 go to logic high "1" level. When the signal ID0 is "x", the signals LD0 through LD3 go to logic high "1" level and the signal LD4 goes to logic low "0" level, respectively.

Incidentally, "x" represents the case that the signal ID0 is other values than "1" to "5". Also, when the signals SY1 through SY4 are all "0", the signals LD0 through LD4 become "0".

Flow of operation of the synchronizing signal generator that has been described so far with reference to FIGS. 11 and 14 will now be described.

Initially, delayed digital data D1, D2, D3, D4 are obtained by delaying the input digital data D0 by the delay time L, and a signal Dx is obtained by delaying digital data D4 by the delay time 2L.

Subsequently, the shift amount data PH0 representing the bit shift amount is obtained by detecting bit shift information contained in the sync. pattern of the digital data D0 by the bit shift detector 26. Signals SD0, SD1, SD2, SD3, SD4 are obtained by shifting the data by the shift amount represented by the shift amount data PH0 by the variable shift registers 27, 28, 29, 30 and 31. Then, the sync/ID detectors 32, 33, 34, 35, 36 set data corresponding to positions of sync patterns and data ID0 and ID1 of the signals SD0, SD1, SD2, SD3, SD4 as {SYNC0, ID0_0, IDi_0}, {SYNC1, ID0_i, IDI_i}, ..., {SYNC4, ID0_4, IDI_4}, and digital data SD0 and SDm (m=1, 2, 3, 4) are compared with each other.

The above comparison is expressed by the following equation (4):

$$SYNC0 = SYNCm = 2EDC \text{ (value of determined sync. pattern)}$$

$$ID0 = ID0\_m + m$$

$$ID1 = ID1\_m \quad (4)$$

When the above-mentioned equation (4) is established, it is determined that the sync. pattern having an interval mL is detected. Accordingly, the synchronizing signal SYm outputted from the masking circuit 14 is made active "1". Then, the signal SYx is obtained by controlling the delay amount by the sync. position corrector 14 on the basis of the value of m. When a plurality of synchronizing signals SYm are detected, a delay amount is determined in the sequential order of the signal having the smallest value of m.

Although the temporary synchronizing signal SYi is obtained when the inertia circuit 13 which generates the pulse of the period L is reset by the signal SYx, it is unavoidable that a portion having an interval shorter than the temporary synchronizing signal SYi is generated. Therefore, the masking circuit 14 is reset by the temporary synchronizing signal SYi to output the synchronizing signal SYm after the above portion was delayed by the delay time L (L clocks) from the temporary synchronizing signal SYi. Thus, it is possible to obtain the synchronizing signal SYm by masking the portion having the interval shorter than the temporary synchronizing signal SYi.

Simultaneously, the bit shift phase corrector 42 obtains a signal PHL by delaying the bit shift amount data PH0 obtained when the synchronizing signal SYm is detected in accordance with the delay amount of the signal SYx. Then, the bit shift phase corrector 42 supplies the signal PHL to the variable shift register 48 and the variable shift register 48 obtains data having a correct phase by bit-shifting the signal Dx supplied thereto from the delay circuit 25 on the basis of the signal PHL supplied thereto.

Operation of the synchronizing signal generator shown in FIGS. 11 and 14 will be described more fully with reference to a flowchart forming FIG. 16.

Figure 16:
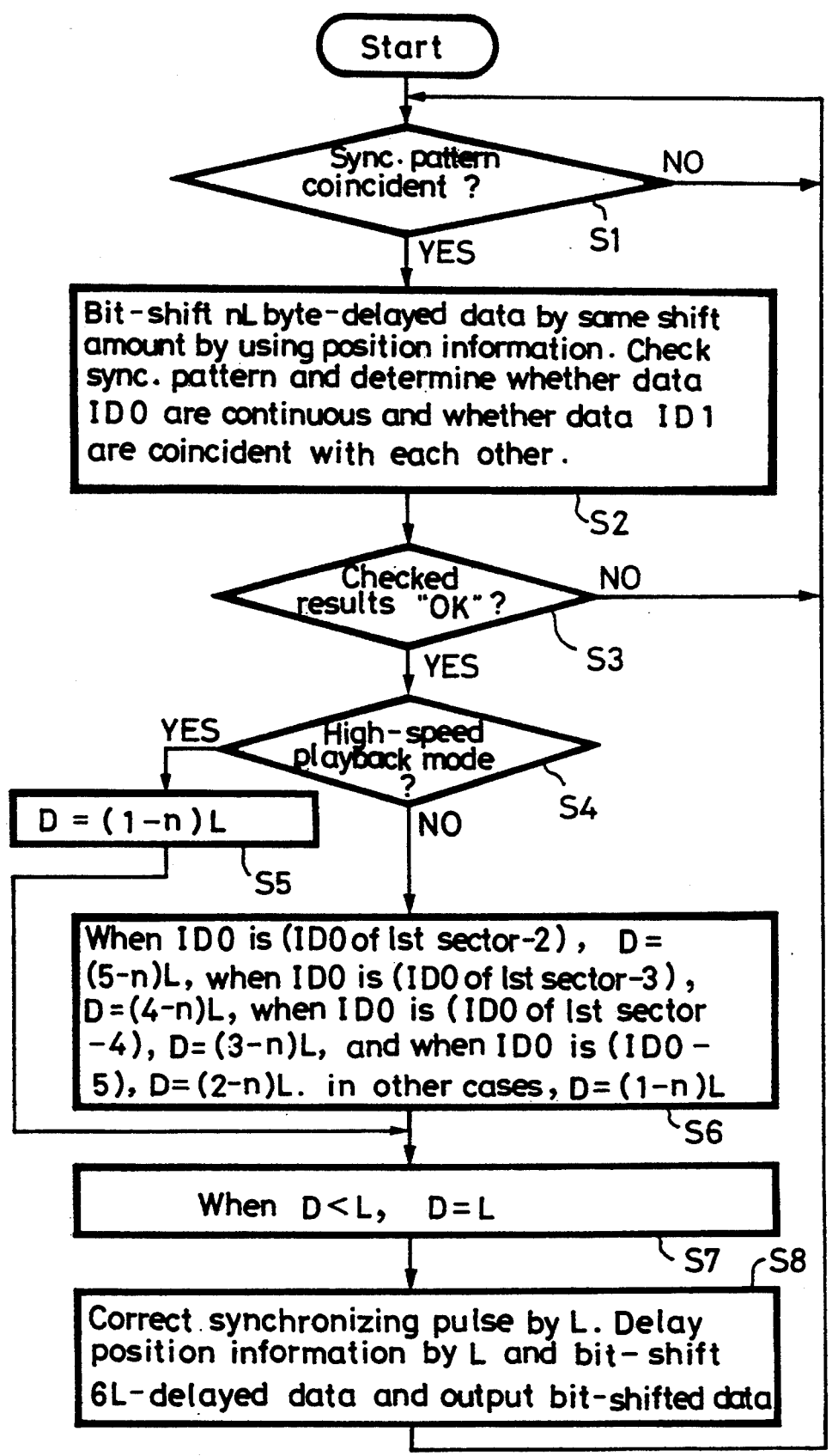
FIG. 16 is a flowchart to which reference will be made in explaining synchronizing signal detecting operation according to the embodiment of the present invention.

Referring to FIG. 16, following the start of operation, it is determined in decision step S1 whether or not a pattern of an incoming signal is coincident with a sync. pattern. If a YES is outputted at decision step S1, then the processing proceeds to the next step S2.

In step S2, data delayed by nL bytes (n=1, 2, 3, ...) is bit-shifted by the same shift amount by using position information of the detected sync. pattern. Then, it is determined whether or not data obtained by bit-shifting is a sync. pattern. Then, there are checked continuity and coincidence of data ID0 and ID1 of the one sync. block in which the sync. pattern is detected and the sync. block delayed by nL bytes. Then, the processing proceeds to the next decision step S3. More specifically, data is delayed by the delay times L to Ln (n=1, 2, 3, ...) by the delay circuits 21 through 25 shown in FIG. 11. Then, the sync/ID detectors 32 through 36 determine whether the data obtained is the sync. pattern, whether or not the data ID0 is continuous and whether or not the data ID1 is the same value.

It is determined in decision step S3 whether the judged results are "OK" or not. Specifically, it is determined whether or not the bit-shifted data is the sync. pattern, whether or not the data ID0 is continuous and whether or not the data ID0 are coincident with each other. If a YES is outputted at decision step S3, then the processing proceeds to the next decision step S4. If on the other hand a NO is outputted at decision step S3, then the processing returns to step S1.

It is determined in decision step S4 whether or not the VTR (not shown) or the like is set in the high speed playback mode. If a YES is outputted at decision step S4, then the processing proceeds to the next step S5. If on the other hand a NO is outputted at decision step S4, then the processing proceeds to step S6.

In step S5, the delay amount D is set to $(1-n)L$, and then the processing proceeds to step S7.

In step S6, when the value of data ID0 is (value of ID0 of the first sector—2), the delay amount D is set to $(5-n)L$. When the value of data ID0 is (value of ID0 of the first sector—3), the delay amount D is set to $(4-n)L$. Similarly, when the value of data ID0 is (value of ID0 of the first sector —4), the delay amount D is set to $(3-n)L$. Similarly, when the value of the data ID0 is (value of ID0 of the first sector 5), the delay amount D is set to $(2-n)L$. In other cases, the delay amount D is set to $(1-n)L$. Then, the processing proceeds to step S7.

In step S7, when the delay amount $D<L$, the delay amount D is set to L, and the processing proceeds to the next step S8.

In step S8, the inertia circuit 13 corrects the synchronizing pulse by the delay time L. Then, position information is delayed by the delay time L and data delayed by 6L is bit-shifted and then outputted. Then, the processing returns to step S1. Specifically, the variable shift register 48 latches therein the output Dx supplied thereto from the delay circuit 25 shown in FIG. 11 on the basis of the signal PHL which is the correction output from the bit shift phase corrector 42.

Operation of the synchronizing signal generator according to the present invention will be described more in detail with reference to FIG. 11 and timing charts forming FIGS. 17A through 17N.

In FIG. 17A, a solid circle represents that the sync. pattern could be detected. In FIG. 17N, a solid circle represents a synchronizing signal obtained when the sync. pattern is detected continuously twice. An open circle in FIG. 17N represents a synchronizing signal generated by the cooperation of the inertia circuit 13 and the masking circuit 14 when the sync. pattern is not detected twice continuously.

When the digital data shown in FIG. 17A is supplied from the reproducing system or digital signal input system of the VTR (not shown) or the like, the sync. pattern shown by the solid circle in FIG. 17A is detected as shown in FIG. 17B. The delay circuit 21 delays this signal D0 to output a signal D1 which is delayed by the time L as shown in FIG. 17C. Then, the delay circuit 22 delays the signal D1 to output a signal D2 which is delayed by the time L as shown in FIG. 17D. The delay circuit 23 delays the signal D2 to output a signal D3 which is delayed by the time L as shown in FIG. 17E. Then, the delay circuit 24 delays the signal D3 to output a signal D4 which is delayed by the time L as shown in FIG. 17F.

The signal D0 and the signals D1 through D4 outputted from the delay circuits 21 through 24 are respectively supplied to the variable shift registers 27, 28, 29, 30 and 31. Then, the variable shift registers 27, 28, 29, 30, 31 output the signals SD0, SD1, SD2, SD3, SD4 (not shown) by bit-shifting the signal D0 and the signals D1 through D4 on the basis of the shift amount data PH0 representing the shift amount supplied thereto from the bit shift detector 26.

The signals SD0, SD1, SD2, SD3, SD4 are supplied to the sync/ID detectors 32, 33, 34, 35, 36, in which they are detected in sync. pattern, data ID0 and ID1, and then supplied to the comparators 37, 38, 39 and 40. Then, the comparators 37, 38, 39, 40 compare the sync. patterns, the continuity of the data ID0 and the coincidence of the values of the data ID1.

FIGS. 17G, 17H, 17I, 17J show the signals SY1, SY2, SY3, SY4 which are supplied from the comparators 37, 38, 39, 40 as compared results. More specifically, when the signal SY1 shown in FIG. 17G goes to logic high "1" level when the sync. patterns (encircled by dashed lines) are obtained from both the signals D0, D1 shown in FIGS. 17B, 17C. The signal SY2 goes to logic high "1" level when the sync. patterns (encircled by dashed lines) are obtained from both the signals D0, D2 shown in FIGS. 17B, 17D. The signal SY3 shown in FIG. 17I goes to logic high "1" level when the sync. patterns (encircled by dashed lines) are obtained from both the signals D0, D3 shown in FIGS. 17B, 17E. The signal SY4 goes to logic high "1" level when the sync. patterns (encircled by dashed lines) are obtained from both the signals D0, D4 shown in FIGS. 17B, 17F.

The sync. position corrector 41 delays the signal SY1 by the delay time 4L as shown in FIG. 17K when a value of bit of the signal SY1 shown in FIG. 17G goes to "1", i.e., the signal SY1 goes to logic high "1" level. Also, the sync. position corrector 41 delays the signal SY2 by the delay time 3L as shown in FIG. 17K when the signal SY2 shown in FIG. 17H goes to logic high "1" level. The sync. position corrector 41 delays the signal SY3 by the delay time 2L as shown in FIG. 17K when the signal SY3 shown in FIG. 17I goes to logic high "1" level. The sync. position corrector 41 delays the signal SY4 by the delay time L as shown in FIG. 17K when the signal SY4 shown in FIG. 17J goes to logic high "1" level. Incidentally, when the signals SY1, SY2, SY3, SY4 shown in FIGS. 17B, 17C, 17D, 17E go to logic high "1" level (i.e., seventh portion encircled by dashed lines in FIGS. 17B, 17C, 17D, 17E), the two signals D0, D1 go to logic high "1" level.

The signal SYx obtained by the sync. position corrector 41 is supplied to the inertia circuit 13. The inertia circuit 13 generates the temporary synchronizing signal SYi at every period based on the signal SYx supplied thereto from the sync. position corrector 41, and supplies the temporary synchronizing signal SYi to the masking circuit 14. The masking circuit 14 obtains the signal SYm shown in FIG. 17M by masking the temporary synchronizing signal SYi shown in FIG. 17L at its temporary synchronizing signal (encircled by dashed lines in FIG. 17L) having a period shorter than other period, and supplies the synchronizing signal SYm through the output terminal 46 to the body circuit of the VTR (not shown) or the like as the signal STP. According to the above-mentioned processing, the synchronizing signal is detected correctly and therefore data can be reproduced satisfactorily.

How to change the delay amount by the synchronizing signal generator on the basis of ID data will be described with reference to FIGS. 18A through 18I. In order to describe this operation conceptionally, reference symbols appeared in FIG. 11 and FIGS. 17A through 17N are not used below. Moreover, in FIGS. 18A through 18I, only the synchronizing signal having the time interval L is detected.

FIG. 18A shows the value of data ID0 by way of example, and FIG. 18B shows input data. The sync. pattern is detected as shown in FIG. 18C, and the signals are delayed by the delay circuits 21 through 25 as shown in FIG. 18D. Further, as shown in FIG. 18E, a signal which goes to logic high "1" is obtained both in the signals shown in FIGS. 18B and 18C and this signal is delayed. At that time, since a difference between the value of data ID0 ("94" in FIG. 18E) obtained when the sync. pattern could be detected and the value of data ID0 ("99" in FIG. 18E) obtained when the sync. pattern could not be detected is "5" as shown by "5" in FIG. 18E, the delay amount is set to "5" ("5L").

FIG. 18F shows a signal obtained by the delay processing. The inertia circuit 13 generates a synchronizing pulse shown in FIG. 18G on the basis of this delayed signal, and the masking circuit 14 carries out the masking. According to the above-mentioned processing, the sync. pattern can be detected correctly, and therefore data can be reproduced satisfactorily.

How the synchronizing signal generator according to the present invention operates when the sync. pattern cannot be detected over the periods L, 2L, 3L will be described with reference to FIGS. 19A through 19J.

In FIGS. 19A through 19J, FIG. 19A shows the value of data ID0 by way of example. FIGS. 19B, 19C and 19D show the case that the sync. pattern cannot be detected over the period L. FIGS. 19E, 19F and 19G show the case that the sync. pattern cannot be detected over the period 2L. FIGS. 19H, 19I and 19J show the case that the sync. pattern cannot be detected over the period 3L. In FIGS. 19B, 19E and 19H, hatched portions show portions from which data are dropped.

How the synchronizing signal generator according to the present invention operates when the sync. pattern cannot be detected over the period L will be described with reference to FIG. 19B, 19C and 19D. When the sync. pattern cannot be detected over the period L as shown in FIG. 19B, the sync. pattern is detected as shown in FIG. 19C, and the inertia circuit 13 generates a synchronizing signal having a period based on the detected sync. pattern as shown in FIG. 19D. Therefore, a synchronizing signal can be obtained accurately as shown in FIG. 19D. In FIG. 19D, a solid circle represents a portion in which a sync. pattern could be detected, and an open circle represents a portion in which a sync. pattern could not be detected.

How the synchronizing signal generator according to the present invention operates when the sync. pattern cannot be detected over the period 2L will be described with reference to FIGS. 19E, 19F and 19G. When the sync. pattern cannot be detected over the period 2L as shown in FIG. 19E, the inertia circuit 13 generates a synchronizing pulse having a period based on the detected sync. pattern as shown in FIG. 19F. Therefore, a sync. pattern can be obtained accurately as shown in FIG. 19G.

Similarly, how the synchronizing signal generator according to the present invention operates when the sync. pattern cannot be detected over the period 3L will be described with reference to FIGS. 19H, 19I and 19J. When the sync. pattern cannot be detected over the period 3L as shown in FIG. 19H, the sync. pattern is detected as shown in FIG. 19H, and the inertia circuit 13 generates a synchronizing signal having a period based on the detected sync. pattern as shown in FIG. 19I so that a synchronizing signal can be accurately obtained as shown in FIG. 19J.

Although the description is overlapped in FIGS. 17A through 17N, how the synchronizing signal generator according to the present invention operates when the sync. pattern cannot be detected over the periods 4L, 2L and L will be described with reference to FIGS. 20A through 20K.

FIG. 20A shows values of ID data and FIG. 20B shows input data. When data shown in FIG. 20B is inputted, the signal D0 from the input terminal 20 and the output signals D1, D2, D3, D4 from the respective delay circuits 21, 22, 23, 24 are brought in the states shown in FIGS. 20C, 20D, 20E, 20F and 20G.

At that time, the signals SY1, SY2, SY3, SY4 outputted from the comparators 37, 38, 39, 40 go to logic high "1" level (signals SY1, SY2, SY3, SY4 are collectively shown in FIG. 20H though they are illustrated separately in FIGS. 17G through 17J) as shown in FIG. 20H when the sync. pattern is obtained from the signal D0, the signal D1 or D2 or D3.

Then, bits shown in FIG. 20H are respectively delayed as the signal SYx as shown in FIG. 20I. More specifically, as shown in FIG. 20I, the bits (corresponding to ID data "31" and "30", ID data "21", "20" "19" in FIG. 20A) obtained when the sync. pattern is obtained from both the signals D0 and D1 are delayed by "1", i.e., "L" as shown in FIG. 20I. A bit (corresponding to ID data "22" shown in FIG. 20A) obtained when the sync. pattern is obtained from both the signals D0 and D2 is delayed by "2", i.e., 2L as shown in FIG. 20I. A bit (corresponding to ID data "22" in FIG. 20A) obtained when the sync. pattern is obtained from both the signals D0 and D4 is delayed by "4", i.e., "4L" as shown in FIG. 20I.

Thus, when the signal SYx shown in FIG. 20I is supplied from the sync. position corrector 41 to the inertia circuit 13, the inertia circuit 13 generates a temporary synchronizing signal SYi shown in FIG. 20J on the basis of the signal SYx shown in FIG. 20I. Then, though not shown, the masking circuit 14 masks a pulse (sixth pulse from left of FIG. 20J) having an interval shorter than those of other pulses as shown in FIG. 20J. Finally, as shown in FIG. 20k, synchronizing signals can be outputted to the portions (shown by open circles in FIG. 20K) in which sync. pattern could not be obtained except the portions (shown by solid circles in FIG. 20K) in which the sync. pattern could be obtained.

A probability Pse (sync. error rate) that the synchronizing signal cannot be detected in the processing of the above-mentioned synchronizing signal generator will be described below.

The probability that the 4 bytes of the sync. patterns {SYNC (2 bytes), ID0 (1 byte), ID1 (1 byte)} will cause an error can be obtained similarly to the aforementioned equations (1) and (2).

Assuming now that the byte error rate Pbyte$=3 \times 10^{-3}$ and that the border of block occurs 1800 times per second, then the period Nb in which the sync. pattern is not obtained at the border of block is expressed by the following equation (5ll):

$$Nb = 1/1800/Pse = 7.48 \text{ (hours)} \tag{5}$$

As will be clear from the equation (5), it is to be understood that the synchronizing signal generator according to this embodiment shown in FIG. 11 through FIGS. 20A to 20K can be considerably improved as compared with the conventional synchronizing signal generator. Therefore, the synchronizing signal generator according to this embodiment can be used satisfactorily in actual practice. In this connection, the period Nb of the conventional synchronizing signal generator is 1.3 (minutes) as expressed by the foregoing equation (3).

As described above, according to the embodiment of the present invention, since the sync. pattern is obtained when phases of bits of two sync. patterns having the intervals L, 2L, 3L, 4L, . . . , contained in data and a relationship of ID data and so on are correct, the probability (sync. error rate) that the sync. pattern cannot be detected can be reduced.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for generating a synchronizing signal from digital data, comprising:
   delay means for delaying said digital data at predetermined time intervals so as to obtain a plurality of digital data having a delay of n times as long as said predetermined time interval (n is a positive integer);
   bit shift detecting means for detecting a phase of said digital data with respect to a fixed data pattern;
   a plurality of bit shifting means for bit-shifting said plurality of digital data outputted from said delay means in response to the phase detected by said bit shift detecting means;
   a plurality of synchronizing detecting means for detecting whether or not said plurality of digital data bit-shifted by said plurality of bit shifting means coincides with said fixed data pattern; and
   synchronizing signal generating means for generating a synchronizing signal in response to an output of said plurality of synchronizing detecting means.

2. The apparatus of claim 1, wherein said plurality of synchronizing detecting means are operable to detect whether or not said plurality of digital data bit-shifted by said plurality of bit shifting means, said fixed data pattern and an identification number whose value changes in response to each predetermined time interval coincide with each other.

3. An apparatus for generating a synchronization signal from a digital signal, comprising:
   means for receiving said digital signal having a plurality of successive blocks of digital data, at least some of said blocks of digital data having synchronization data;
   delay means for delaying the received digital signal by a plurality of integer multiples of a predetermined delay time to produce a respective plurality of successively delayed digital signals;
   means for detecting the synchronization data in the received digital signal to produce an initial synchronization signal;
   means for detecting the synchronization data in each of the successively delayed digital signals to produce a plurality of respective synchronization signals;
   means for comparing said initial synchronization signal with each of said plurality of synchronization signals to produce respective compared output signals;
   means for producing a synchronization correction signal from each of said compared output signals by correcting said compared outputs signals in accordance with respective delays of each of said respective plurality of successively delayed digital signals from which said respective compared output signals are derived; and
   means for generating said synchronization signal from said synchronization correction signal.

4. The apparatus of claim 3, wherein said means for detecting the synchronization data is further operable to detect respective identification data in each of the successively delayed digital signals; and said means for comparing is operable to compare said initial synchronization signal and identification data in said received signal with each of said plurality of synchronization signals and said respective identification data to produce said respective compared output signals.

5. The apparatus of claim 3, wherein said compared output signals have a first value when said initial synchronization signal corresponds to said respective one of said plurality of synchronization signals and have a second value when said initial synchronization signal does not correspond to said respective one of said plurality of synchronization signals.

6. The apparatus of claim 3, wherein said means for producing a synchronization correction signal is comprised of:
   means for delaying said compared output signals by respective delay times corresponding to said respective delays of each of said respective plurality of successively delayed digital signals from which said respective compared output signals are derived; and
   means for combining the delayed compared output signals to produce said synchronization correction signal.

7. The apparatus of claim 6, wherein L equals said predetermined delay time; said delay means is operable to delay the received digital signal by an amount of time $N \times L$ (N is a positive integer from 1 to M) to produce said respective delayed digital signals; and said means for delaying said compared output signals is operable to delay each of said compared output signals by an amount of delay time equal to $(M+1) \times L$ reduced by the amount of delay time to produce said respective delayed digital signal from which said respective compared output signal is derived.

8. The apparatus of claim 3, wherein said means for generating said synchronization signal is comprised of:
   means for adding additional synchronization data to said synchronization correction signal in accordance with an amount of time corresponding to said predetermined delay time after occurrence of said synchronization data in said synchronization correction signal to produce a temporary synchronization signal; and
   means for masking said synchronization data in said temporary synchronization signal corresponding to those synchronization data occurring less than said predetermined delay time prior to occurrence of a successive synchronization data so as to produce said synchronization signal.

9. The apparatus of claim 3, further comprising means for detecting a phase of the received digital data with respect to a fixed data pattern representing said synchronization data; and means for shifting bits of each of said plurality of successively delayed digital signals in accordance with the detected phase.

10. A method of generating a synchronization signal from a digital signal, comprising the steps of:
  receiving a digital signal having a plurality of successive blocks of digital data, at least some of said blocks of digital data having synchronization data;
  delaying the received digital signal by a plurality of integer multiples of a predetermined delay time to produce a respective plurality of successively delayed digital signals;
  detecting the synchronization data in the received digital signal to produce an initial synchronization signal;
  detecting the synchronization data in each of the successively delayed digital signals to produce a plurality of respective synchronization signals;
  comparing said initial synchronization signal with each of said plurality of synchronization signals to produce respective compared output signals;
  producing a synchronization correction signal from each of said compared output signals by correcting said compared outputs signals in accordance with respective delays of each of said respective plurality of successively delayed digital signals from which said respective compared output signals are derived; and
  generating said synchronization signal from said synchronization correction signal.

11. The method of claim 10, wherein said step of detecting the synchronization data is carried out by detecting respective identification data in each of the successively delayed digital signals; and said step of comparing is carried out by comparing said initial synchronization signal and identification data in said received signal with each of said plurality of synchronization signals and said respective identification data to produce said respective compared output signals.

12. The method of claim 10, wherein said compared output signals have a first value when said initial synchronization signal corresponds to said respective one of said plurality of synchronization signals and have a second value when said initial synchronization signal does not correspond to said respective one of said plurality of synchronization signals.

13. The method of claim 10, wherein said step of producing a synchronization correction signal is includes the steps of:
  delaying said compared output signals by respective delay times corresponding to said respective delays of each of said respective plurality of successively delayed digital signals from which said respective compared output signals are derived; and
  combining the delayed compared output signals to produce said synchronization correction signal.

14. The method of claim 13, wherein L equals said predetermined delay time; said step of delaying the received digital signal is carried out by delaying the received digital signal by an amount of time N×L (N is a positive integer from 1 to M) to produce said respective delayed digital signals; and said step of delaying said compared output signals is carried out by delaying each of said compared output signals by an amount of delay time equal to (M+1)×L reduced by the amount of delay time to produce said respective delayed digital signal from which said respective compared output signal is derived.

15. The method of claim 10, wherein said step of generating said synchronization signal includes the steps of:
  adding additional synchronization data to said synchronization correction signal in accordance with an amount of time corresponding to said predetermined delay time after occurrence of said synchronization data in said synchronization correction signal to produce a temporary synchronization signal; and
  masking said synchronization data in said temporary synchronization signal corresponding to those synchronization data occurring less than said predetermined delay time prior to occurrence of a successive synchronization data so as to produce said synchronization signal.

16. The method of claim 10, further comprising the steps of detecting a phase of the received digital data with respect to a fixed data pattern representing said synchronization data; and shifting bits of each of said plurality of successively delayed digital signals in accordance with the detected phase.

* * * * *